(12) United States Patent
Elshafie et al.

(10) Patent No.: US 12,096,501 B2
(45) Date of Patent: Sep. 17, 2024

(54) HARVESTING ENERGY FROM CLUSTERS OF NODES

(71) Applicant: QUALCOMM Incorporated, San Diego, CA (US)

(72) Inventors: Ahmed Elshafie, San Diego, CA (US); Ahmed Attia Abotabl, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/930,284

(22) Filed: Sep. 7, 2022

(65) Prior Publication Data

US 2023/0141393 A1 May 11, 2023

(30) Foreign Application Priority Data

Nov. 9, 2021 (GR) .............................. 20210100785

(51) Int. Cl.
*H04W 76/15* (2018.01)
*H04W 76/14* (2018.01)

(52) U.S. Cl.
CPC ........... *H04W 76/15* (2018.02); *H04W 76/14* (2018.02)

(58) Field of Classification Search
CPC .............................. H04W 76/14; H04W 76/15
USPC ......................................................... 307/104
See application file for complete search history.

(56) References Cited

U.S. PATENT DOCUMENTS

| 9,888,337 | B1 * | 2/2018 | Zalewski | ............... H04W 76/10 |
| 2017/0025857 | A1 * | 1/2017 | Matthews | ............... H02J 50/80 |
| 2018/0131201 | A1 * | 5/2018 | Calhoun | ................. H02J 50/80 |
| 2022/0346022 | A1 * | 10/2022 | Butt | .................. H04W 52/0251 |

\* cited by examiner

*Primary Examiner* — William Hernandez
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, an indication of a cluster of nodes that are able to provide signals to the UE for energy harvesting at the UE. The UE may receive, from the cluster of nodes, the signals based at least in part on the indication of the cluster of nodes. The UE may harvest energy from the signals for charging a battery of the UE. Numerous other aspects are described.

30 Claims, 18 Drawing Sheets

HARVESTING ENERGY FROM CLUSTERS OF NODES

CROSS-REFERENCE TO RELATED APPLICATION

This patent application claims priority Greece Provisional Patent Application No. 20210100785, filed on Nov. 9, 2021, entitled "HARVESTING ENERGY FROM CLUSTERS OF NODES," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for harvesting energy from clusters of nodes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network node, an indication of a cluster of nodes that are able to provide signals to the UE for energy harvesting at the UE; receive, from the cluster of nodes, the signals based at least in part on the indication of the cluster of nodes; and harvest energy from the signals for charging a battery of the UE.

In some implementations, an apparatus for wireless communication at a network node includes a memory and one or more processors, coupled to the memory, configured to: determine a cluster of nodes that are able to provide signals to a UE for energy harvesting at the UE; and transmit, to the UE, an indication of the cluster of nodes, wherein the signals from the cluster of nodes enable the energy harvesting at the UE.

In some implementations, a method of wireless communication performed by a UE includes receiving, from a network node, an indication of a cluster of nodes that are able to provide signals to the UE for energy harvesting at the UE; receiving, from the cluster of nodes, the signals based at least in part on the indication of the cluster of nodes; and harvesting energy from the signals for charging a battery of the UE.

In some implementations, a method of wireless communication performed by a network node includes determining a cluster of nodes that are able to provide signals to a UE for energy harvesting at the UE; and transmitting, to the UE, an indication of the cluster of nodes, wherein the signals from the cluster of nodes enable the energy harvesting at the UE.

In some implementations, a non-transitory computer-readable medium storing a set of instructions for wireless communication includes one or more instructions that, when executed by one or more processors of a UE, cause the UE to: receive, from a network node, an indication of a cluster of nodes that are able to provide signals to the UE for energy harvesting at the UE; receive, from the cluster of nodes, the signals based at least in part on the indication of the cluster of nodes; and harvest energy from the signals for charging a battery of the UE.

In some implementations, a non-transitory computer-readable medium storing a set of instructions for wireless communication includes one or more instructions that, when executed by one or more processors of a network node, cause the network node to: determine a cluster of nodes that are able to provide signals to a UE for energy harvesting at the UE; and transmit, to the UE, an indication of the cluster of nodes, wherein the signals from the cluster of nodes enable the energy harvesting at the UE.

In some implementations, an apparatus for wireless communication includes means for receiving, from a network node, an indication of a cluster of nodes that are able to provide signals to the apparatus for energy harvesting at the apparatus; means for receiving, from the cluster of nodes, the signals based at least in part on the indication of the cluster of nodes; and means for harvesting energy from the signals for charging a battery of the apparatus.

In some implementations, an apparatus for wireless communication includes means for determining a cluster of nodes that are able to provide signals to a UE for energy harvesting at the UE; and means for transmitting, to the UE, an indication of the cluster of nodes, wherein the signals from the cluster of nodes enable the energy harvesting at the UE.

Aspects generally include a method, apparatus, system, computer program product, non-transitory computer-readable medium, user equipment, network node, network entity, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
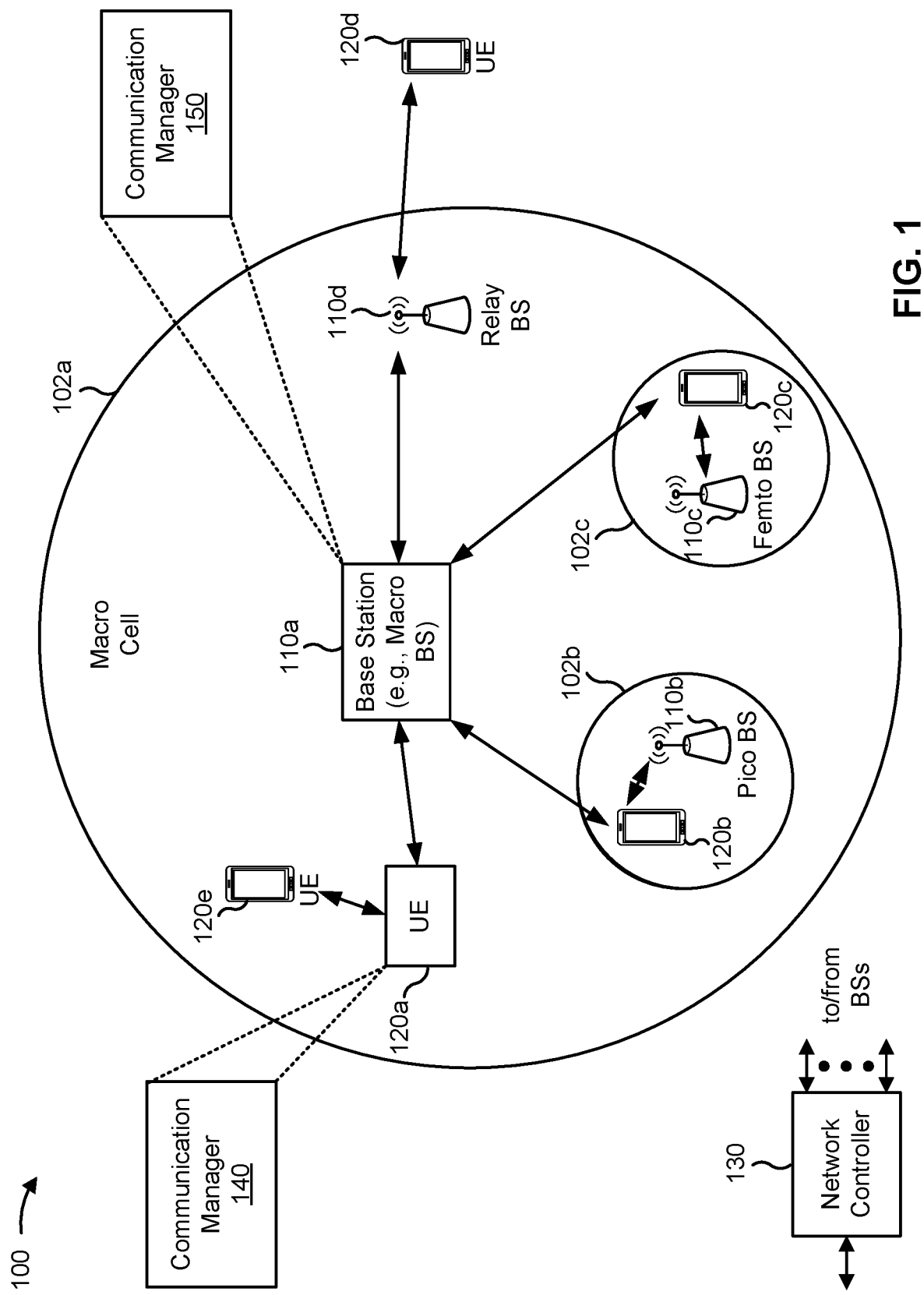
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the terms "base station" (e.g., the base station 110) or "network node" may refer to an aggregated base station, a disaggregated base station, an integrated access and backhaul (IAB) node, a relay node, and/or one or more components thereof. For example, in some aspects, "base station" or "network node" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the base station 110. In some aspects, the terms "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations and/or one or more virtual base station functions. For example, in some aspects, two or more base station functions may be instantiated on a single device. In some aspects, the terms "base station" or "network node" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a customer premises equipment (CPE). A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, an indication of a cluster of nodes that are able to provide signals to the UE for energy harvesting at the UE; receive, from the cluster of nodes, the signals based at least in part on the indication of the cluster of nodes; and harvest energy from the signals for charging a battery of the UE. Additionally, or alternatively, the communication manager 140 may perform one or more other operations described herein.

In some aspects, a network node (e.g., base station 110) may include a communication manager 150. As described in more detail elsewhere herein, the communication manager 150 may determine a cluster of nodes that are able to provide signals to a UE for energy harvesting at the UE; and transmit, to the UE, an indication of the cluster of nodes, wherein the signals from the cluster of nodes enable the energy harvesting at the UE. Additionally, or alternatively, the communication manager 150 may perform one or more other operations described herein.

As indicated above, FIG. 1 is provided as an example. Other examples may differ from what is described with regard to FIG. 1.

Figure 2:
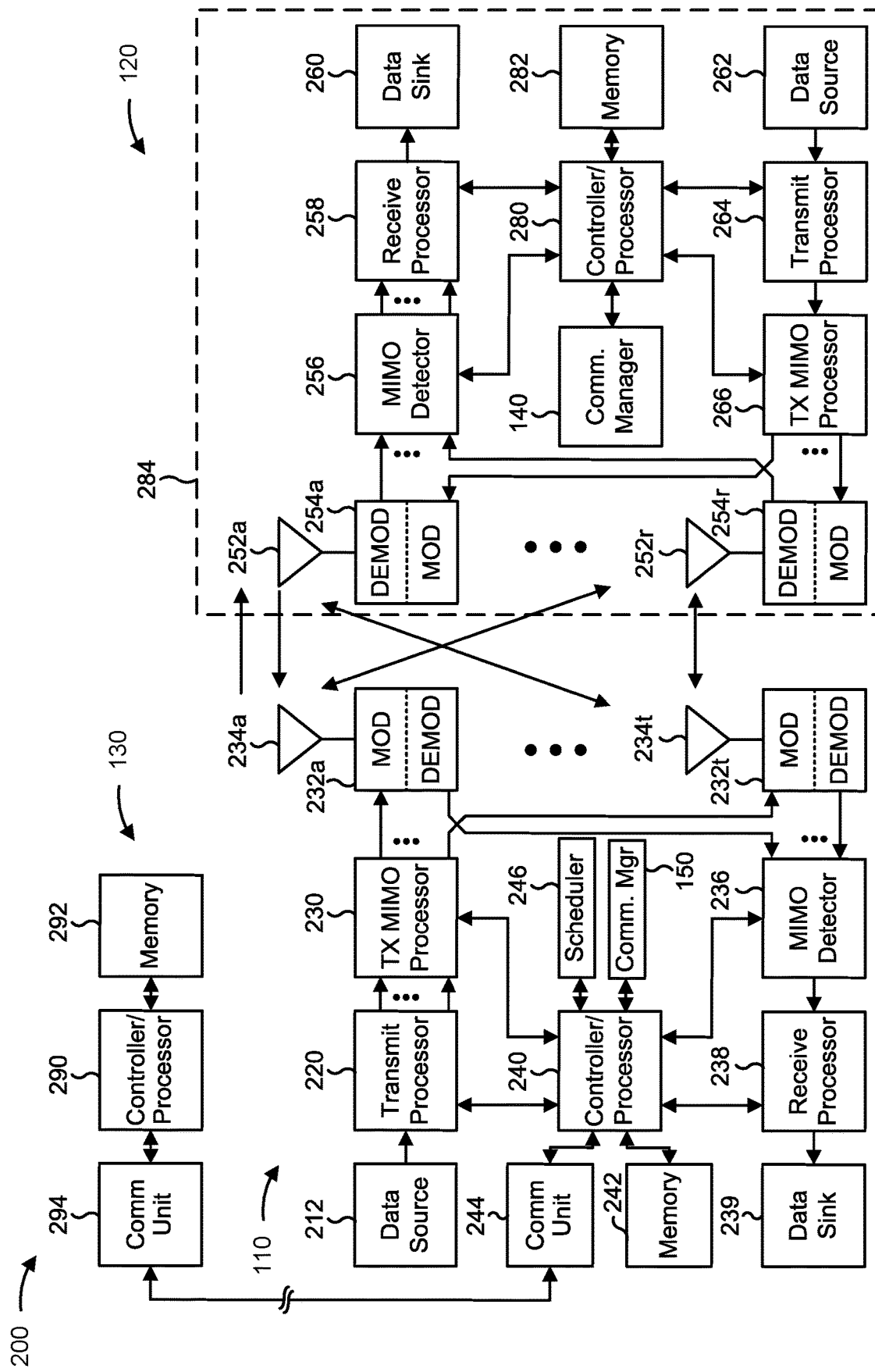
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 12-17).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 12-17).

The controller/processor 240 of the base station 110, the controller/processor 280 of the UE 120, and/or any other component(s) of FIG. 2 may perform one or more techniques associated with harvesting energy from clusters of nodes, as described in more detail elsewhere herein. For example, the controller/processor 240 of the base station 110, the controller/processor 280 of the UE 120, and/or any other component(s) of FIG. 2 may perform or direct operations of, for example, process 1400 of FIG. 14, process 1500 of FIG. 15, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, an indication of a cluster of nodes that are able to provide signals to the UE for energy harvesting at the UE; means for receiving, from the cluster of nodes, the signals based at least in part on the indication of the cluster of nodes; and/or means for harvesting energy from the signals for charging a battery of the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., base station) includes means for determining a cluster of nodes that are able to provide signals to a UE for energy harvesting at the UE; and/or means for transmitting, to the UE, an indication of the cluster of nodes, wherein the signals from the cluster of nodes enable the energy harvesting at the UE. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Harvesting radio frequency (RF) energy may be used to perform some tasks at a device (e.g., a UE, a wearable device, a smart watch, a low power device), such as data decoding, filter operation, data reception, data encoding, and/or data transmission. A purpose of RF energy harvesting may not be to charge a battery of the device in full, but rather to charge the battery of the device (or to use a dedicated battery for energy harvesting) such that some tasks may be performed using the harvested energy. These tasks may be performed based at least in part on an accumulation of harvested energy over a period of time. The harvested energy may be derived from RF signals transmitted in a network. The device may interact with the network using the harvested energy.

RF energy harvesting may be useful in IoT cases. For example, RF energy harvesting may lead to a longer battery lifespan of an IoT device with a battery. As another example, RF energy harvesting may lead to a battery-less IoT device, such as a medical sensor or an implanted sensor.

An amount of energy that may be harvested from RF signals may be based at least in part a signal frequency, a signal source, a distance traveled by the RF signals, a Tx power associated with the RF signals, and/or an Rx power associated with the RF signals. The signal frequency may be associated with a very high frequency (VHF) or an ultra-high frequency (UHF). The signal source may be a tower or another device, such as a UE.

Energy harvesting may be derived from various sources, such as solar, vibration, thermal, laser or light, and/or RF. Energy harvesting from a solar source may use photovoltaic cells, and may provide a relatively high power density, but requires exposure to light (not implantable). Energy harvesting from a vibration source may use piezoelectric, electrostatic, and/or electromagnetic techniques, and may be implantable, but may suffer from material physical limitations. Energy harvesting from a thermal source may use thermoelectric or pyroelectric techniques, and may provide a relatively high power density and be implantable, but may produce excess heat. Energy harvesting from RF may use an antenna, and may be implantable, but may provide a relatively low power density where an efficiency is inversely proportional to a distance.

Figure 3:
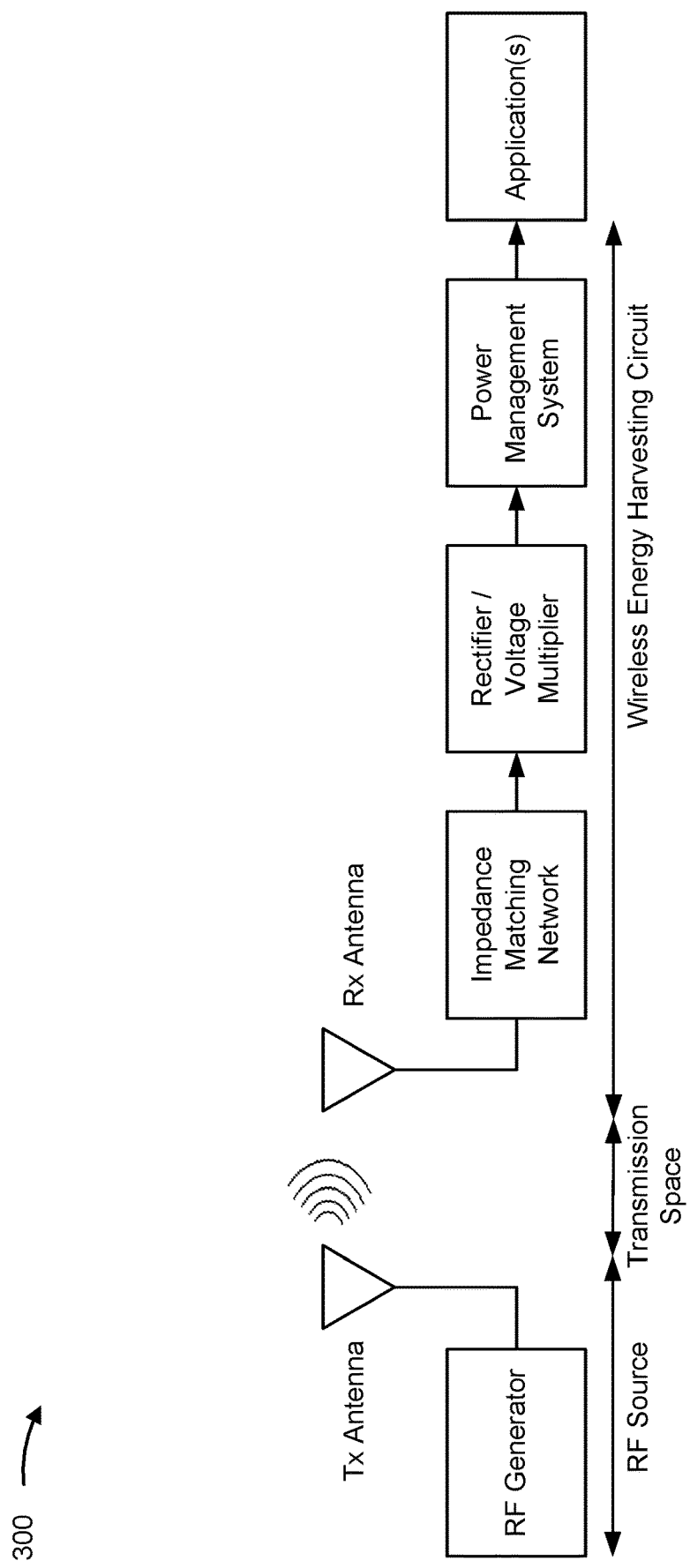
FIG. 3 is a diagram illustrating an example of a radio frequency (RF) energy harvesting system, in accordance with the present disclosure.

FIG. 3 is a diagram illustrating an example 300 of an RF energy harvesting system, in accordance with the present disclosure.

As shown in FIG. 3, an RF generator, acting as an RF source, may generate an RF signal. The RF generator may transmit, via a Tx antenna, the RF signal. The RF signal may be transmitted over a transmission space, and the RF signal may be received at an Rx antenna of a device. The RF signal may be directed to a wireless energy harvesting circuit of the device. The wireless energy harvesting circuit may include an impedance matching network and a rectifier/voltage multiplier, which may be responsible for converting the RF signal to power (e.g., direct current (DC) power). A power management system may be responsible for storing the power, and providing the power to application(s) of the device as needed.

As indicated above, FIG. 3 is provided as an example. Other examples may differ from what is described with regard to FIG. 3.

Figure 4:
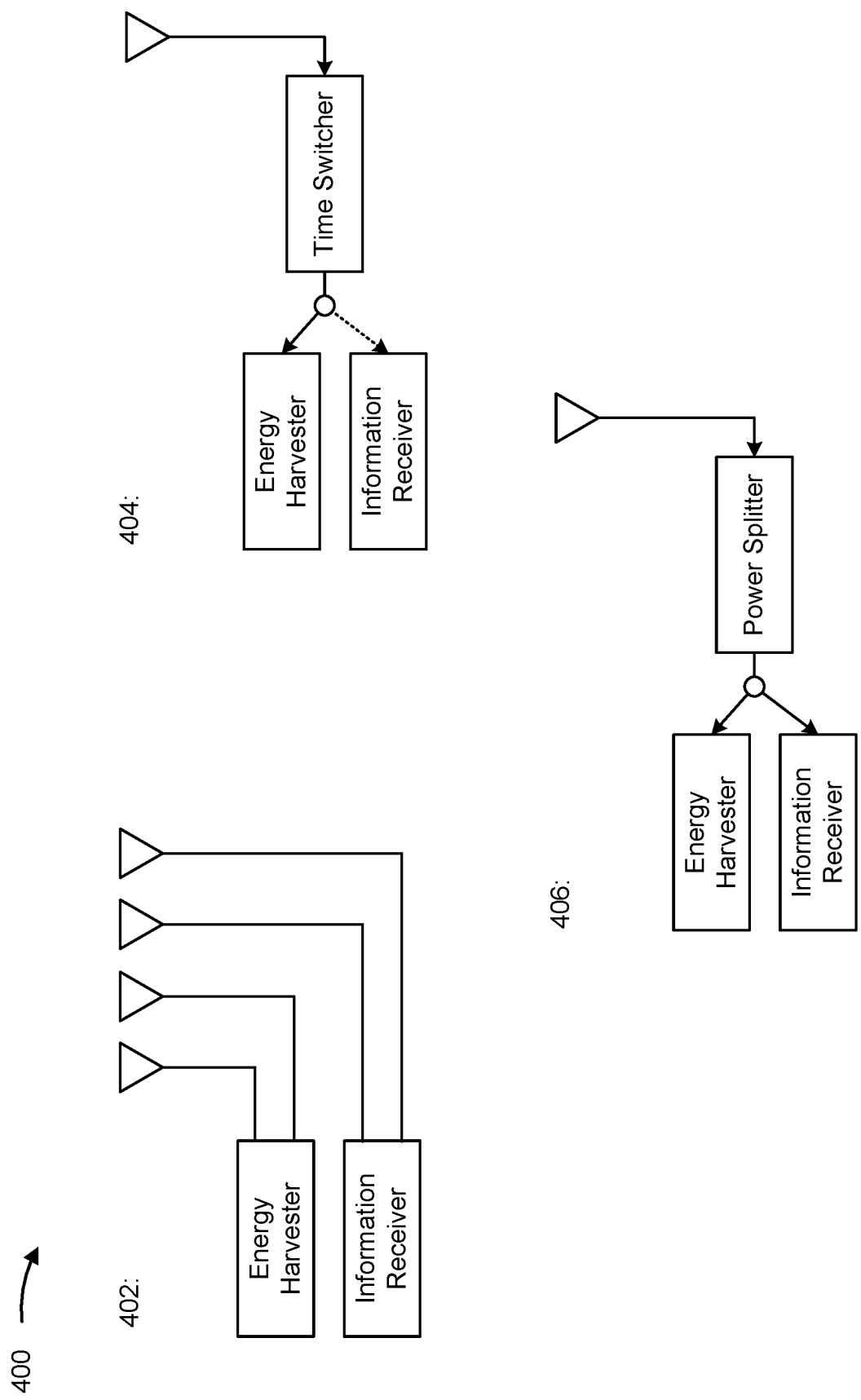
FIG. 4 is a diagram illustrating an example of energy harvesting schemes, in accordance with the present disclosure.

FIG. 4 is a diagram illustrating an example 400 of energy harvesting schemes, in accordance with the present disclosure.

As shown by reference number 402, a separated receiver architecture may be used for energy harvesting. An energy harvester of a device may receive RF signals from a first set of antennas. An information receiver of a device may receive RF signals from a second set of antennas. The energy harvester may function in a simultaneous manner with the information receiver, and received RF signals may be separate for the energy harvester and the information receiver.

As shown by reference number 404, a time switching architecture may be used for energy harvesting. The device may switch between the energy harvester and the information receiver using time switching, with a common antenna shared between the energy harvester and the information receiver. In other words, all RF signals received at the antenna may be directed to the energy harvester when a path is switched to be directed to the energy harvester. On the other hand, all RF signals received at the antenna may be directed to the information receiver when a path is switched to be directed to the information receiver.

As shown by reference number 406, a power splitting architecture may be used for energy harvesting. The common antenna between the energy harvester and the information receiver may receive RF signals, and the received RF signals may be split into two streams for the energy harvester and the information receiver. In other words, a power of the received RF signals may be split between the energy harvester and the information receiver.

As indicated above, FIG. 4 is provided as an example. Other examples may differ from what is described with regard to FIG. 4.

Sidelink is a wireless communication link between UEs. Sidelink may be referred to as a PC5 interface. Sidelink may be used for sidelink communication between UEs. The sidelink communication may be a local D2D communication. Sidelink may be used as a relay for a network coverage extension and power saving (e.g., for a reduced capability UE). Some UEs may have a link to a network node (e.g., a base station) in a cellular network, where the link may be referred to as a Uu interface. A UE may perform a sidelink discovery to detect another UE, and sidelink communication may be performed between the two UEs after the sidelink discovery.

Figure 5:
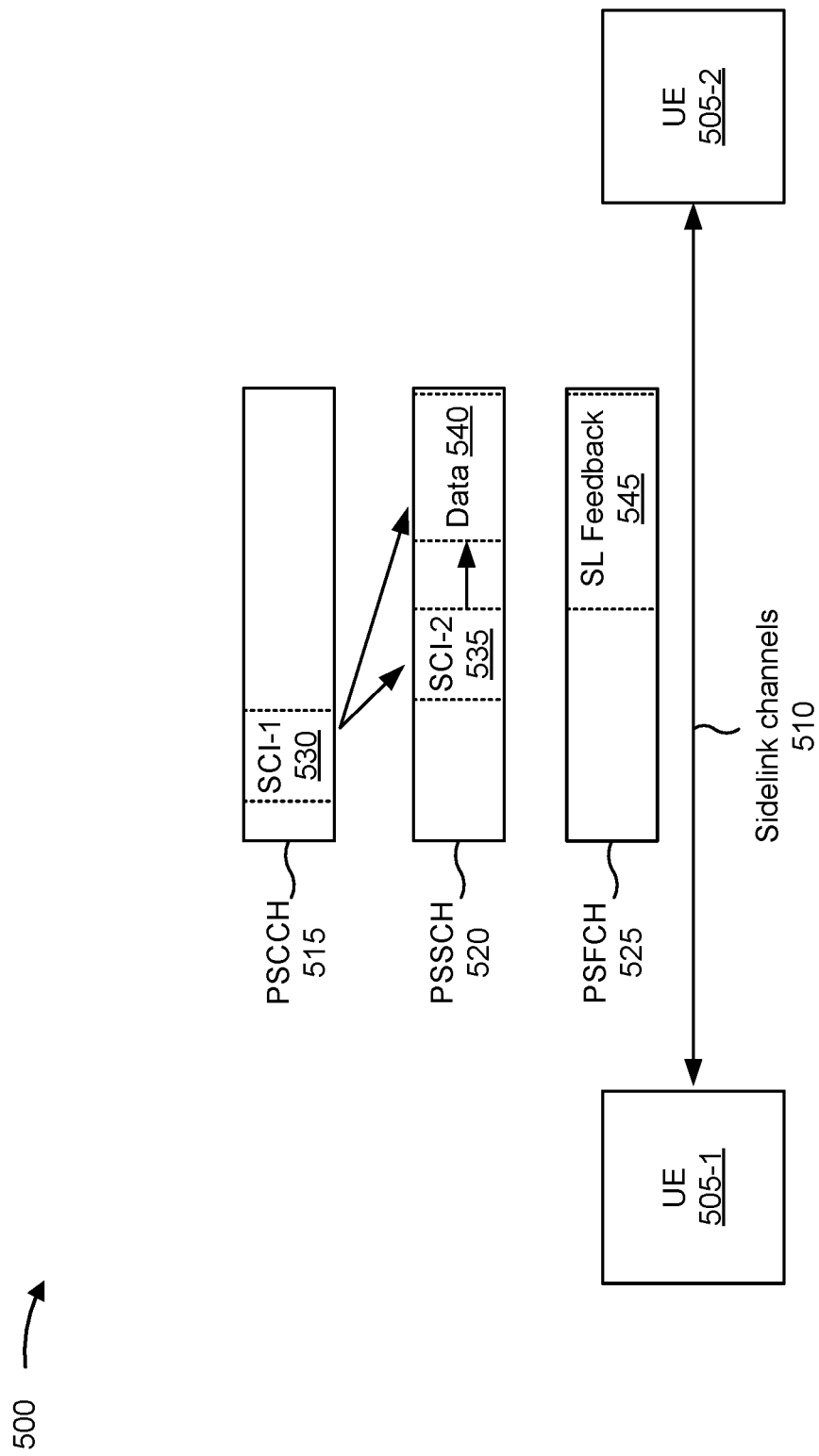
FIG. 5 is a diagram illustrating an example of sidelink communications, in accordance with the present disclosure.

FIG. 5 is a diagram illustrating an example 500 of sidelink communications, in accordance with the present disclosure.

As shown in FIG. 5, a first UE 505-1 may communicate with a second UE 505-2 (and one or more other UEs 505) via one or more sidelink channels 510. The UEs 505-1 and 505-2 may communicate using the one or more sidelink channels 510 for P2P communications, D2D communications, V2X communications (e.g., which may include V2V communications, V2I communications, and/or vehicle-to-person (V2P) communications), and/or mesh networking. In some aspects, the UEs 505 (e.g., UE 505-1 and/or UE 505-2) may include one or more other UEs described elsewhere herein, such as UE 120. In some aspects, the one or more sidelink channels 510 may use a PC5 interface, may operate in a high frequency band (e.g., the 5.9 GHz band), and/or may operate on an unlicensed or shared frequency band (e.g., an NR unlicensed (NR-U) frequency band). Additionally, or alternatively, the UEs 505 may synchronize timing of transmission time intervals (TTIs) (e.g., frames, subframes, slots, and/or symbols) using global navigation satellite system (GNSS) timing.

As further shown in FIG. 5, the one or more sidelink channels 510 may include a physical sidelink control channel (PSCCH) 515, a physical sidelink shared channel (PSSCH) 520, and/or a physical sidelink feedback channel (PSFCH) 525. The PSCCH 515 may be used to communicate control information, similar to a physical downlink control channel (PDCCH) and/or a physical uplink control channel (PUCCH) used for cellular communications with a base station 110 via an access link or an access channel. The PSSCH 520 may be used to communicate data, similar to a physical downlink shared channel (PDSCH) and/or a physical uplink shared channel (PUSCH) used for cellular communications with a base station 110 via an access link or an access channel.

In some aspects, the first UE 505-1 may communicate signals to the second UE 505-2 via the one or more sidelink channels 510, and the second UE 505-2 may harvest energy from the signals. The second UE 505-2 may receive the signals from the first UE 505-1 based at least in part on an indication of a cluster of nodes received at the second UE 505-2 from a base station.

The PSCCH 515 may carry sidelink control information stage 1 (SCI-1) 530, which may indicate various control information used for sidelink communications. The control information may include an indication of one or more resources (e.g., time resources, frequency resources, and/or spatial resources) where various types of information may be carried on the PSSCH 520, information for decoding sidelink communications on the PSSCH 520, a quality of service (QoS) priority value, a resource reservation period, a PSSCH demodulation reference signal (DMRS) pattern, an sidelink control information (SCI) format and a beta offset for sidelink control information stage 2 (SCI-2) 535 transmitted on the PSSCH 520, a quantity of PSSCH DMRS ports, and/or an MCS.

The information carried on the PSSCH 520 may include the SCI-2 535 and/or data 540. The SCI-2 535 may include various types of information, such as a hybrid automatic repeat request (HARM) process ID, a new data indicator (NDI) associated with the data 540, a source identifier, a destination identifier, and/or a channel state information (CSI) report trigger. In some aspects, a UE 505 may transmit both the SCI-1 530 and the SCI-2 535. In some aspects, a UE 505 may transmit only SCI-1 530, in which case one or more types of the information that would otherwise be transmitted in the SCI-2 535 may be transmitted in the SCI-1 530 instead.

The PSFCH 525 may be used to communicate sidelink feedback 545, such as HARQ feedback (e.g., acknowledgement or negative acknowledgement (ACK/NACK) information), transmit power control (TPC), and/or a scheduling request (SR).

As indicated above, FIG. 5 is provided as an example. Other examples may differ from what is described with respect to FIG. 5.

Figure 6:
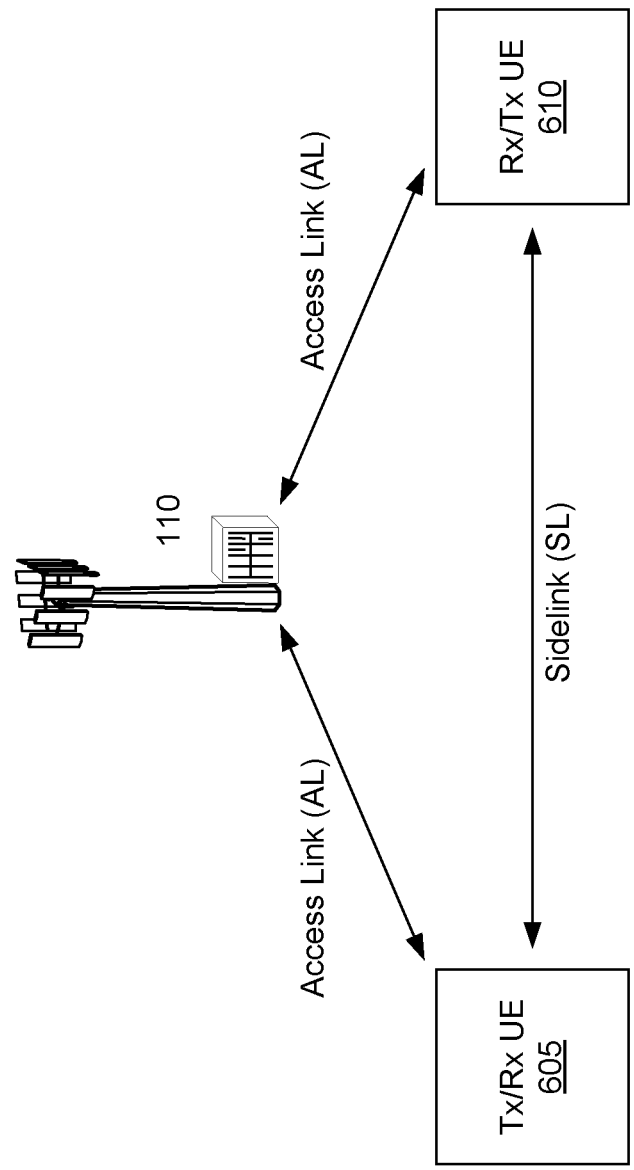
FIG. 6 is a diagram illustrating an example of sidelink communications and access link communications, in accordance with the present disclosure.

FIG. 6 is a diagram illustrating an example 600 of sidelink communications and access link communications, in accordance with the present disclosure.

As shown in FIG. 6, a Tx/Rx UE 605 and an Rx/Tx UE 610 may communicate with one another via a sidelink, as described above in connection with FIG. 5. As further shown, in some sidelink modes, a base station 110 may communicate with the Tx/Rx UE 605 via a first access link. Additionally, or alternatively, in some sidelink modes, the base station 110 may communicate with the Rx/Tx UE 610 via a second access link. The Tx/Rx UE 605 and/or the Rx/Tx UE 610 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the Tx/Rx UE 605 may communicate signals to the Rx/Tx UE 610 via the sidelink, and the Rx/Tx UE 610 may harvest energy from the signals. The Rx/Tx UE 610 may receive the signals from the Tx/Rx UE 605 based at least in part on an indication of a cluster of nodes received at the Rx/Tx UE 610 from a base station.

As indicated above, FIG. 6 is provided as an example. Other examples may differ from what is described with respect to FIG. 6.

Figure 7:
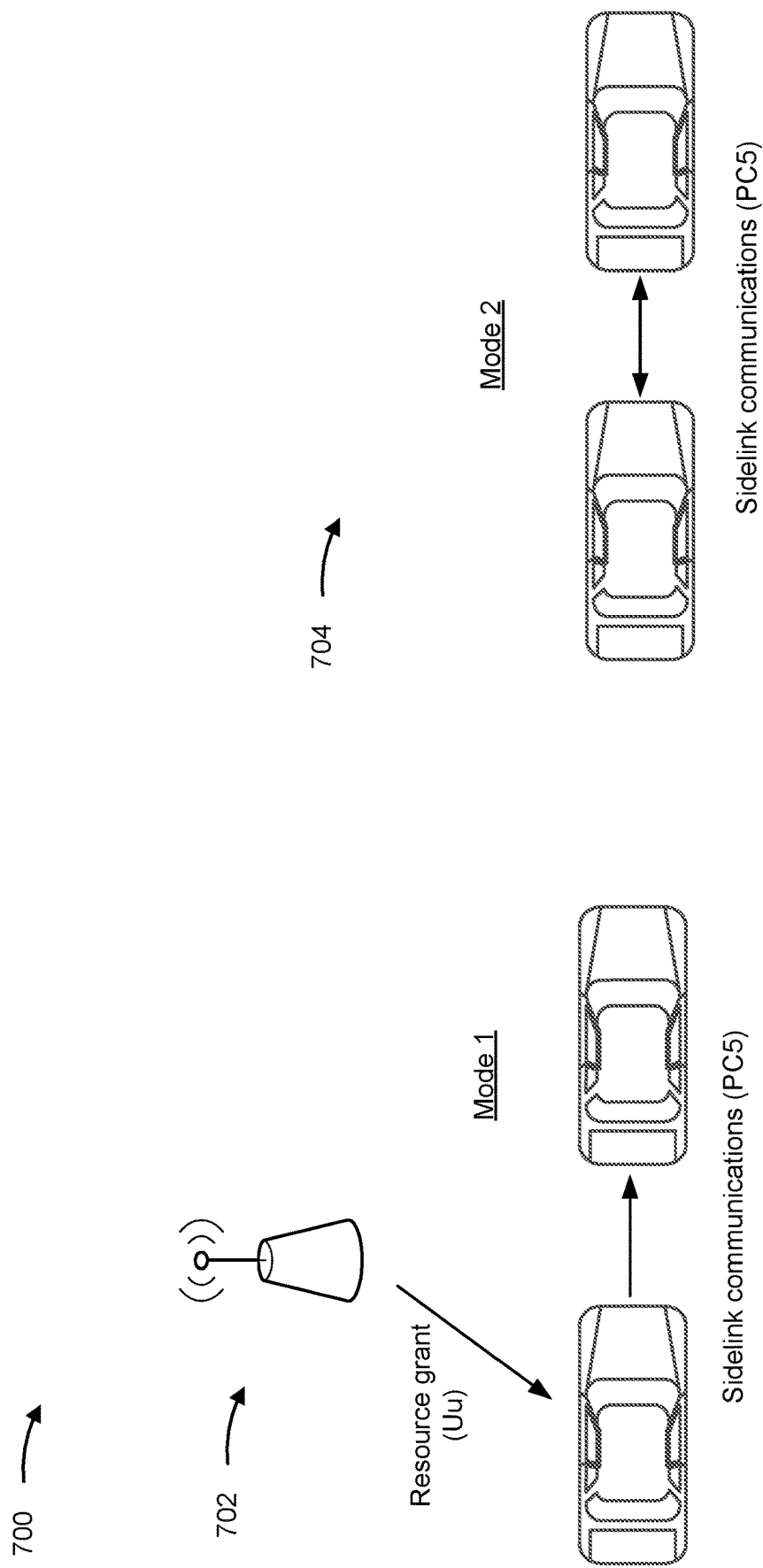
FIG. 7 is a diagram illustrating an example of sidelink operating modes, in accordance with the present disclosure.

FIG. 7 is a diagram illustrating an example 700 of sidelink operating modes, in accordance with the present disclosure.

As shown by reference number 702, a first resource allocation mode in NR sidelink may involve a base station allocating resources for sidelink communications between UEs. For example, the base station may transmit a resource grant via a Uu interface to a first UE. The first UE may communicate with a second UE via a sidelink interface (e.g., a PC5 interface) based at least in part on the resource grant received from the base station.

As shown by reference number 704, a second resource allocation mode in NR sidelink may involve UEs autonomously selecting sidelink resources. For example, the first UE may select a sidelink resource, and the first UE may communicate with the second UE based at least in part on the sidelink resource.

From a receiver perspective (e.g., a second UE that receives a sidelink communication from a first UE), there may be no difference between the first resource allocation mode and the second resource allocation mode. Further, NR sidelink may support HARQ-based retransmissions.

As indicated above, FIG. 7 is provided as an example. Other examples may differ from what is described with respect to FIG. 7.

Sidelink communications may occur in transmission and/or reception resource pools. A minimum resource allocation unit in frequency may be a sub-channel. A resource allocation in time may be a slot. A slot may or may not be available for sidelink. A slot may or may not include feedback resources. A radio resource control (RRC) configuration that configures slots for a UE may be based at least in part on a pre-configuration (e.g., preloaded on the UE) or a configuration (e.g., from a base station).

Figure 8:
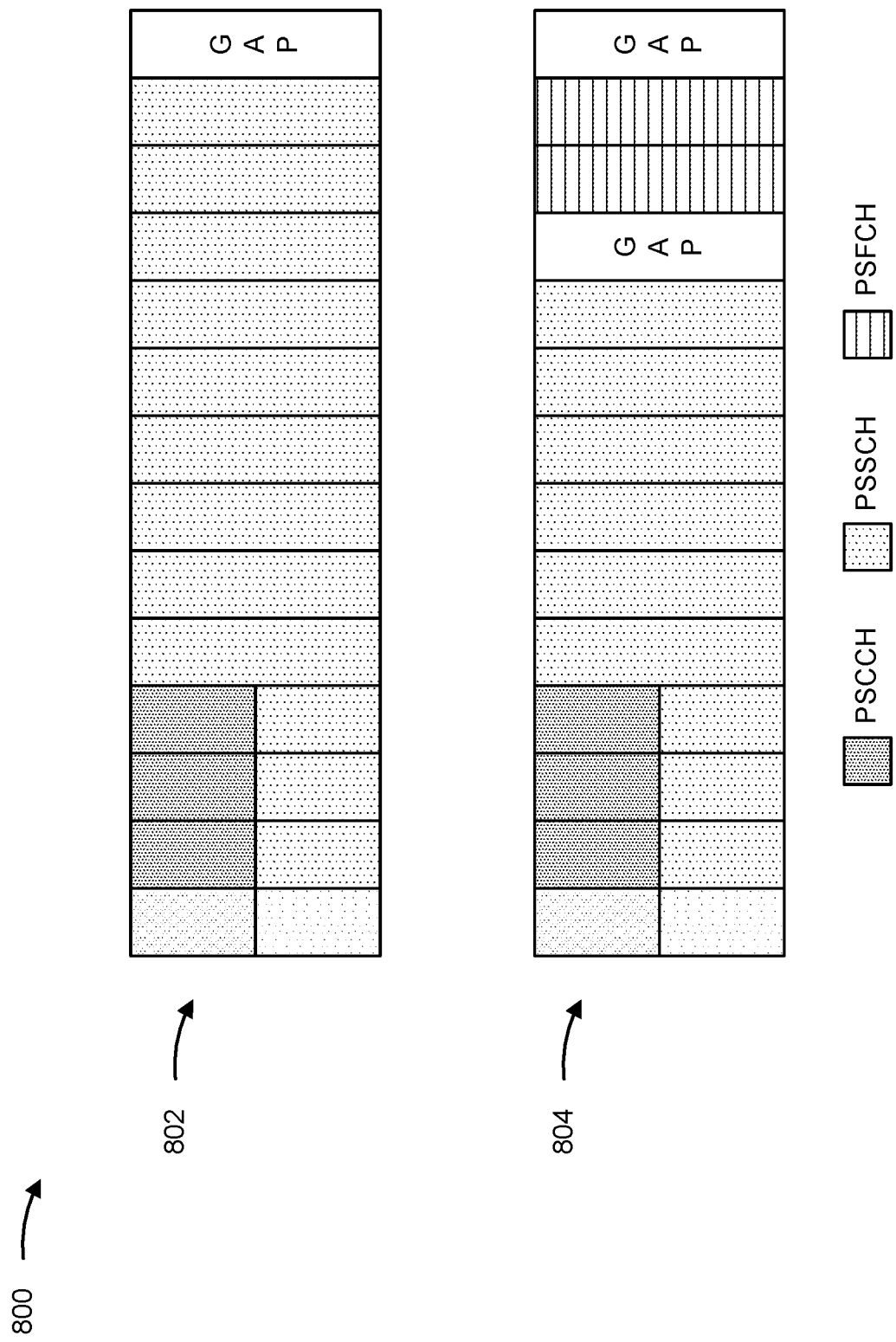
FIG. 8 is a diagram illustrating an example of a slot structure, in accordance with the present disclosure.

FIG. 8 is a diagram illustrating an example 800 of a slot structure, in accordance with the present disclosure.

As shown by reference number 802, a slot may be configured without feedback resources. The slot may include 14 OFDM symbols. Sidelink may be (pre)configured to occupy fewer than 14 symbols in a slot. A first symbol in the slot may be repeated on a preceding symbol for automatic gain control (AGC) purposes. The slot may include a PSCCH and a PSSCH. A gap symbol may be present after the PSSCH. A sub-channel size may be (pre)configured to {10, 15, 20, 25, 50, 75, 100} physical resource blocks (PRBs). The PSCCH and the PSSCH may be transmitted in the same slot.

As shown by reference number 804, a slot may be configured with feedback resources. The slot may include 14 OFDM symbols. The slot may include a PSCCH, a PSSCH, and a PSFCH. Resources for the PSFCH may be configured with a period of {0, 1, 2, 4} slots. The PSFCH may include two OFDM symbols, which may include a first OFDM symbol dedicated to the PSFCH and a second OFDM symbol for AGC purposes. A gap symbol may be present after the PSFCH.

As indicated above, FIG. 8 is provided as an example. Other examples may differ from what is described with respect to FIG. 8.

SCI may be in two stages for forward compatibility. The SCI may include SCI-1 and SCI-2. The SCI-1 may be transmitted on a PSCCH and may include information for resource allocation and for decoding the SCI-2. The SCI-2 may be transmitted on the PSSCH and may include information for decoding data via a shared channel. Both the SCI-1 and the SCI-2 may use PDCCH polar codes to improve reliability.

SCI-1 may include priority information (e.g., QoS values), a PSSCH resource assignment (e.g., frequency/time resources for the PSSCH), a resource reservation period (if enabled), a PSSCH DMRS pattern (if more than one pattern is (pre)configured), an SCI-2 format (e.g., information associated with a size of the SCI-2), a two-bit beta offset for an SCI-2 resource allocation, a number of PSSCH DMRS ports (e.g., one or two), and/or a 5-bit MCS.

SCI-2 formats may include a HARQ process ID, an NDI, a source ID, a destination ID, and/or a CSI report trigger (applicable to unicast), which may be used to determine a new transport block or a transport block retransmission. SCI-2 formats may include, for a groupcast option associated with a NACK-only distance-based feedback, a zone ID indicating a location of a transmitter and/or a maximum communication range for sending feedback.

A PSCCH duration may be (pre)configured to be two or three symbols. The PSCCH may be (pre)configured to span {10, 12, 15, 20, 25} PRBs, and may be limited to a single sub-channel. A DMRS may be present in every PSCCH symbol and may be placed on every fourth resource element (RE). A frequency domain orthogonal cover code (FD-OCC) may be applied to the DMRS to reduce an impact of colliding PSCCH transmissions. A transmitter UE may randomly select from a set of pre-defined FD-OCCs. A starting symbol for the PSCCH may be a second symbol in a slot (e.g., after a first symbol which may be used for AGC).

Figure 9:
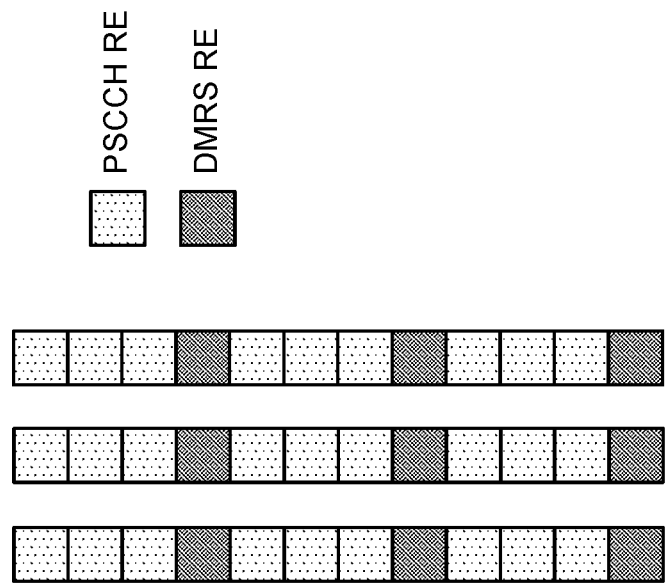
FIG. 9 is a diagram illustrating an example of demodulation reference signal (DMRS) resource elements, in accordance with the present disclosure.

FIG. 9 is a diagram illustrating an example 900 of DMRS resource elements, in accordance with the present disclosure.

As shown in FIG. 9, a plurality of PSCCH REs may be in a frequency domain. A DMRS may be present in a PSCCH symbol (e.g., in every PSCCH symbol). The DMRS may occur in every fourth RE. In other words, three PSCCH REs in the frequency domain may be followed by a single DMRS RE, and so on.

As indicated above, FIG. 9 is provided as an example. Other examples may differ from what is described with respect to FIG. 9.

One and two layer transmissions may be supported with quadrature phase shift keying (QPSK), 16-quadrature amplitude modulation (16-QAM), 64-QAM, and/or 256-QAM. Two-symbol, three-symbol, and/or four-symbol DMRS patterns may be (pre)configured for use by a transmitter. The transmitter may select a DMRS pattern and may transmit an indication of the DMRS pattern in SCI-1, according to channel conditions. Further, DMRS patterns for a 9-symbol PSSCH and/or a 12-symbol PSSCH may be defined.

Figure 10:
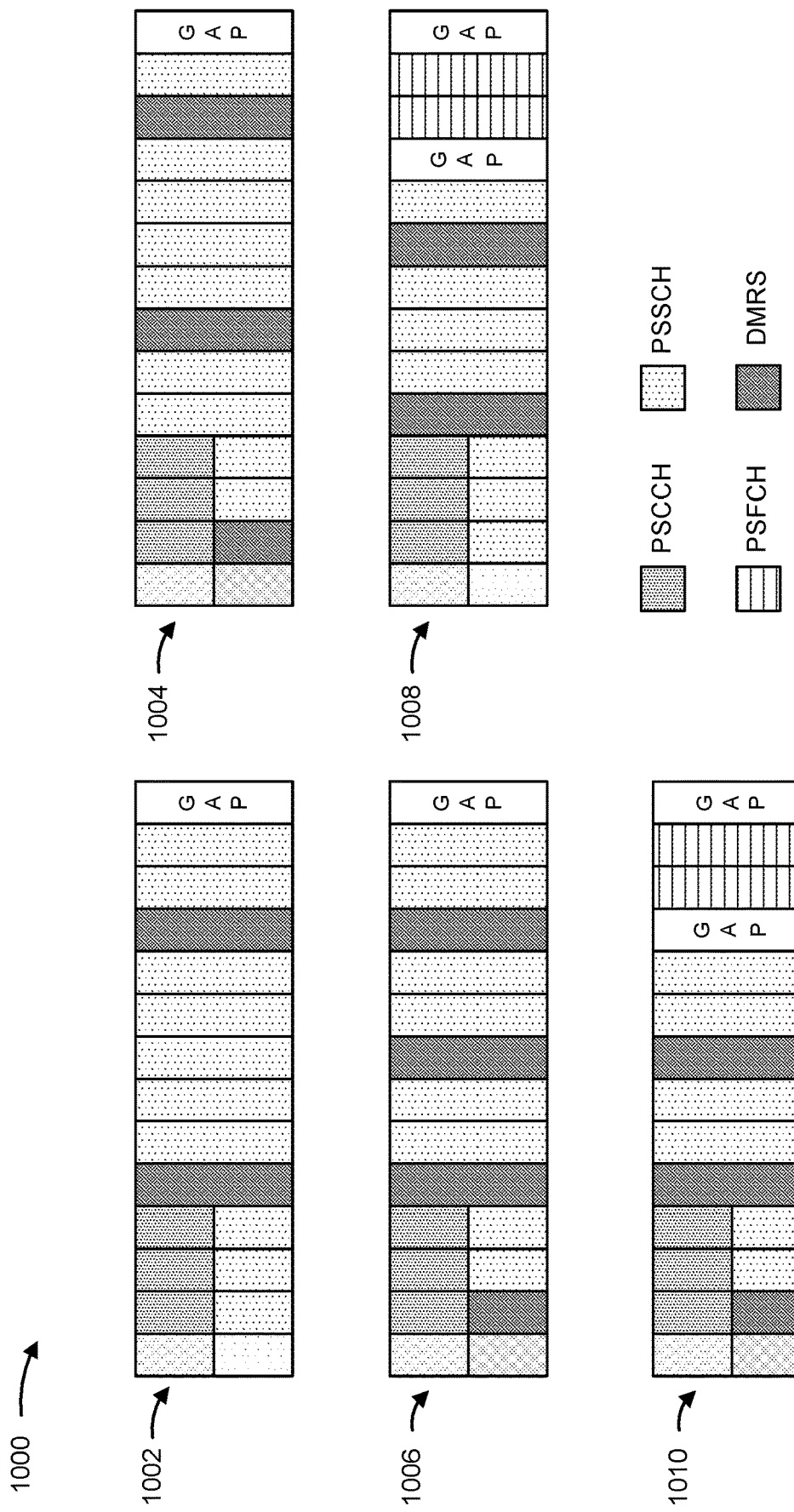
FIG. 10 is a diagram illustrating an example of demodulation reference signal (DMRS) patterns, in accordance with the present disclosure.

FIG. 10 is a diagram illustrating an example 1000 of DMRS patterns, in accordance with the present disclosure.

As shown by reference number 1002, a two-symbol DMRS pattern may include a first DMRS in symbol 4 and a second DMRS in symbol 10. As shown by reference number 1004, a three-symbol DMRS pattern may include a first DMRS in symbol 1, a second DMRS in symbol 6, and a third DMRS in symbol 11. As shown by reference number 1006, a four-symbol DMRS pattern may include a first DMRS in symbol 1, a second DMRS in symbol 4, a third DMRS in symbol 7, and a fourth DMRS in symbol 10. As shown by reference number 1008, a two-symbol DMRS pattern may include a first DMRS in symbol 4 and a second DMRS in symbol 8. As shown by reference number 1010, a three-symbol DMRS pattern may include a first DMRS in symbol 1, a second DMRS in symbol 4, and a third DMRS in symbol 7.

As indicated above, FIG. 10 is provided as an example. Other examples may differ from what is described with respect to FIG. 10.

Figure 11:
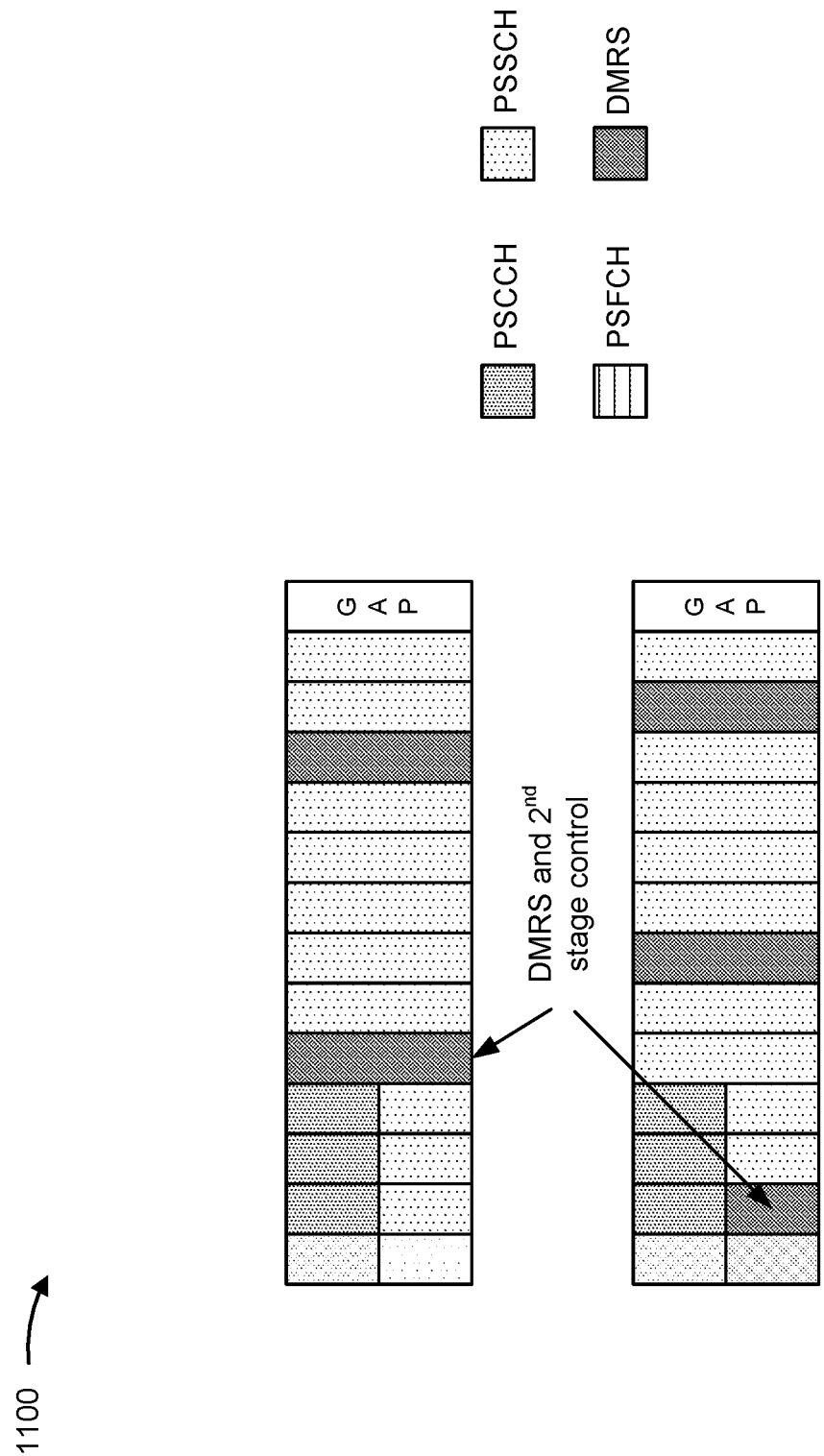
FIG. 11 is a diagram illustrating an example of sidelink control information, in accordance with the present disclosure.

FIG. 11 is a diagram illustrating an example 1100 of sidelink control information, in accordance with the present disclosure.

As shown in FIG. 11, SCI-2 may be mapped to contiguous resource blocks in a PSSCH starting from a first symbol with a PSSCH DMRS. SCI-2 may be scrambled separately from a sidelink shared channel (SL-SCH) and may use QPSK. SCI-2 may not be associated with blind decoding, since an SCI-2 format may be indicated in SCI-1, a number of REs may be derived from SCI-1 content, and a starting location may be known. When an SL-SCH transmission is on two layers, SCI-2 modulation symbols may be copied on both layers.

As indicated above, FIG. 11 is provided as an example. Other examples may differ from what is described with respect to FIG. 11.

A UE, such as an IoT device or another type of low power device, may be capable of energy harvesting. The UE may harvest energy from signals (e.g., RF signals) transmitted to the UE from nodes, which may include other UEs and/or base stations. The UE receive the signals from the nodes, and the UE may derive energy from the signals. The UE may use harvested energy from the signals to perform communications, and/or charge a battery of the UE. An amount of energy that the UE may harvest from a signal may be based at least in part on a distance between the UE and a node that transmits the signal. For example, the UE may be able to harvest more energy from a signal that is transmitted from a node that is located relatively close to the UE, as opposed to a node that is located relatively far away from the UE.

One problem is that the UE may be unaware of nodes that are located relatively close to the UE. The UE may be unaware of which nodes are located relatively close by and may be used for energy harvesting. Further, even with nodes that are located relatively close to the UE, the UE may be unaware of which nodes are best suited for sending/transferring energy to the UE. For example, the UE may be surrounded by a plurality of nodes that potentially may be able to send/transfer energy to the UE, but the UE may be unaware of which nodes are best suited for sending/transferring energy to the UE. Different nodes may have different capabilities in terms of sending/transferring energy to the UE. Some nodes may be located relatively close to the UE, but other tasks performed by the nodes may prevent the nodes from sending/transferring energy to the UE. The UE may be unable to distinguish between which nodes to use for energy harvesting.

In various aspects of techniques and apparatuses described herein, a UE may receive, from a network node (e.g., a base station), an indication of a cluster of nodes that are configured to provide signals to the UE for energy harvesting at the UE. The cluster of nodes may include one or more other UEs, CPEs, dedicated cells or devices, and/or network nodes. The cluster of nodes may be associated with positions that is within a range of a position associated with the UE. The cluster of nodes may include a plurality of nodes that are associated with a same zone identifier. The cluster of nodes may include a plurality of nodes that are associated with a same pathloss range in relation to the UE. The UE may receive, from the cluster of nodes, the signals based at least in part on the indication of the cluster of nodes. The UE may receive the signals between a sidelink interface between the UE and each node in the cluster of nodes (e.g., when the cluster of nodes includes the other UEs). The UE may harvest energy from the signals for charging a battery of the UE. In some aspects, the indication received from the base station may enable the UE to determine which nodes are to be used for energy harvesting. Otherwise, the UE may attempt to perform energy harvesting from nodes that are busy with other tasks and cannot provide signals with sufficient power to the UE, or the UE may attempt to perform energy harvesting from nodes that are located relatively far away from the UEs and thus transmit signals that provide relatively little power to the UE.

Figure 12:
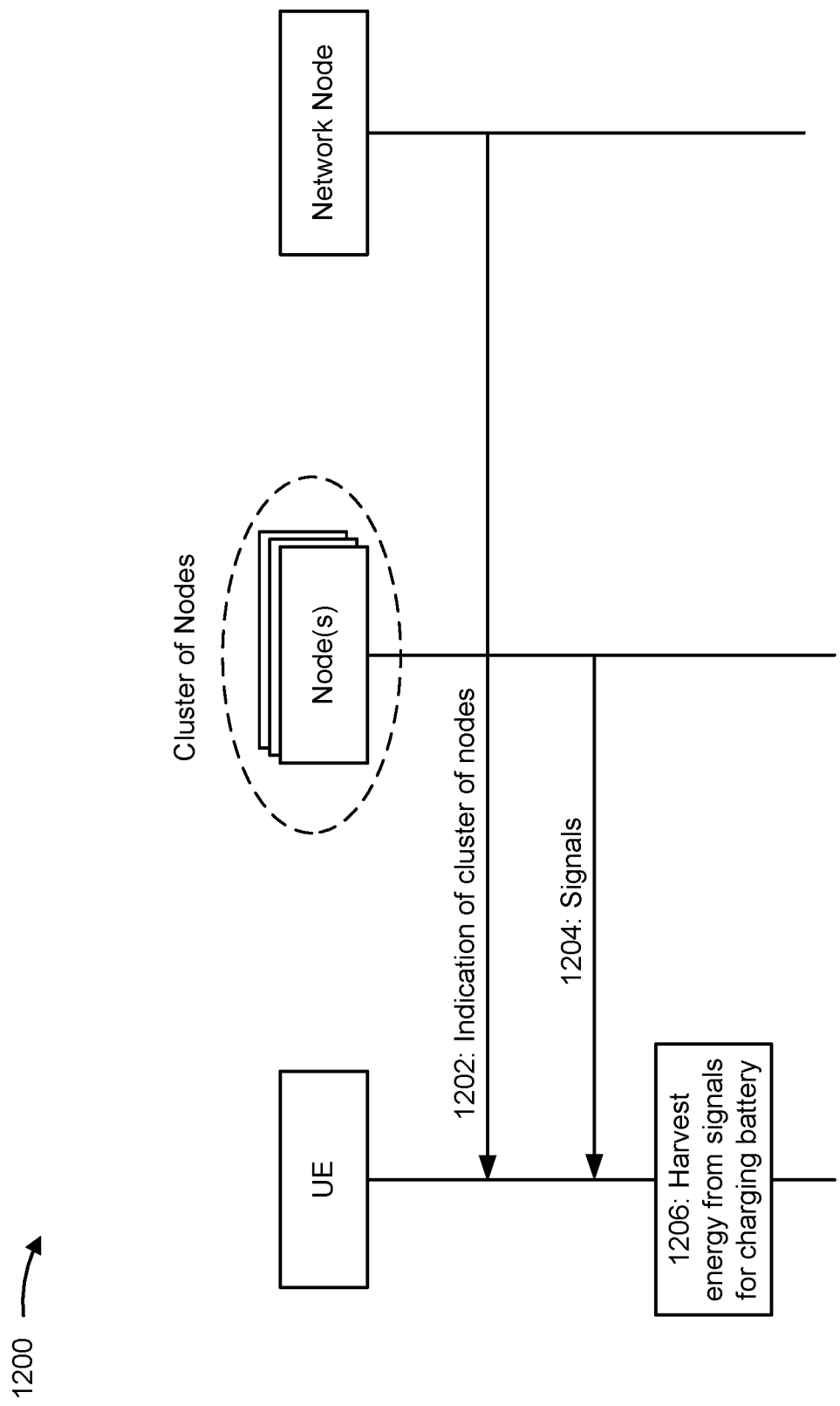
FIGS. 12-13 are diagrams illustrating examples associated with harvesting energy from clusters of nodes, in accordance with the present disclosure.

FIG. 12 is a diagram illustrating an example 1200 associated with harvesting energy from clusters of nodes, in accordance with the present disclosure. As shown in FIG. 12, example 1200 includes communication between a UE (e.g., UE 120a, which may be an IoT device), a node (e.g., UE 120e), and a network node (e.g., base station 110). In some aspects, the UE, the node, and the network node may be included in a wireless network, such as wireless network 100. The node may be included in a cluster of nodes.

In some aspects, the UE may be an IoT device or another type of low power device, which may be a piece of hardware, such as a sensor, actuator, gadget, appliance, or machine, that may be programmed for certain applications. The UE may receive and transmit data over the Internet or other networks. The UE may be a smart watch, smart eyewear, smart refrigerator, smart door lock, and so on. In some aspects, the UE may be a backscatter/tag. The backscatter/tag may receive a carrier wave from a backscatter reader, and the backscatter/tag may transmit a reflected signal to the backscatter reader. In some aspects, the UE may be an energy harvesting UE (e.g., a device that is able to receive energy). The UE may be an IoT device, a personal IoT (P-IoT) device, a zero power IoT device, an ambient IoT, a radio frequency identification (RFID) tag device, or a reduced capability UE.

As shown by reference number 1202, the UE may receive, from a network node, an indication of a cluster of nodes that are configured to provide signals to the UE for energy harvesting at the UE. The cluster of nodes may include one or more other UEs, CPEs, dedicated cells or devices, and/or network nodes. The cluster of nodes may be associated with a position that is within a range of a position associated with the UE. The cluster of nodes may include a plurality of nodes that are associated with a same zone identifier. The cluster of nodes may include a plurality of nodes that are associated with a same pathloss range in relation to the UE. In some aspects, the indication of the cluster of nodes may indicate a number of nodes from the cluster of nodes to be used for energy harvesting or a maximum number of nodes from the cluster of nodes to be used for energy harvesting.

In some aspects, multiple UEs may have a good source of power supply, and these UEs may be able to power other devices. The network node may divide the UEs into clusters or groups based at least in part on a positioning of the UEs relative to a UE that is to receive energy (e.g., an Rx power receiving IoT device, or an energy harvesting IoT device). Alternatively, a network unit, a controlling UE, a programmable logic controller (PLC), or a primary UE may divide the UEs into clusters/groups based at least in part on the positioning of the UEs. The network unit, the controlling UE, the PLC, or the primary UE may divide the UE based at least in part on coordination signaling between a network node (e.g., a gNB or network unit) and a PLC, sidelink UE, or primary UE. Alternatively, a network unit, a controlling UE, a PLC, or a primary UE may divide the UEs into clusters/groups based at least in part on the ability of such UEs to provide power to energy harvesting UEs/IoT devices at energy harvesting cycles of those devices. The energy harvesting devices may be associated/configured with certain energy harvesting cycles, and power providing UEs may be selected based at least in part on their ability/availability to provide wireless energy during the energy harvesting times of the energy harvesting devices. Energy harvesting times may refer to times during which the energy harvesting device may be configured or able to perform wireless harvesting from the network. In some aspects, the UE may be configured for energy harvesting. The energy harvesting may be an RF energy harvesting or another type of wireless energy charging, which may be provided from one device to another device. For example, the UE may be configured for laser or light energy harvesting, in which one device may transmit a laser beam to another device, and energy may be harvested from the laser beam.

In some aspects, the UE may be surrounded by K potential nodes for sending/transferring energy to the UE. Some of these nodes may be capable of powering other devices and may be a suitable power supply source, while other nodes may not be capable of powering other devices and may not be a suitable power supply source. The network node may divide the K potential nodes into clusters (or groups) of nodes, where nodes in a particular cluster may be capable of sending/transferring energy to the UE. In some aspects, the network node may divide the K potential nodes into different clusters based at least in part on a positioning of nodes relative to the UE. Nodes that are located relatively close together may be grouped together to form a cluster. In some aspects, the network node may cluster the K potential nodes based at least in part on different zones. For example, nodes associated with a same zone identifier may be grouped together to form a cluster. In some cases, multiple clusters per zone identifier may be used, based at least in part on a positioning of nodes. In some aspects, the network node may cluster the K potential nodes based at least in part on path losses to the UE and power headroom reports associated with different nodes. For example, nodes associated with a similar pathloss to the UE (e.g., pathlosses that are all within a certain range) may imply that the nodes are located relatively close to each other, so these nodes may be grouped together to form a cluster. The network node may transmit, to the UE, the indication of the cluster of nodes to be used for energy harvesting at the UE based at least in part the clustering of the nodes, as performed by the network node. In some aspects, the indication of the cluster of nodes may indicate a selection of Z nodes from the K potential nodes, or a maximum of Z nodes from the K potential nodes, which may be used for energy harvesting at the UE.

In some aspects, the network node may select more than one cluster of nodes to power the UE. In some aspects, the network node may select a subset of nodes from the cluster of nodes across multiple clusters to power the UE. The network node may transmit, to the UE, the indication of the cluster of nodes to be used for energy harvesting at the UE, which may indicate the more than one cluster of nodes or the subset of nodes.

In some aspects, the network node may associate a priority level to the cluster of nodes, which may be in relation to other clusters of nodes. The priority level associated with energy transfer or the priority level selected for the cluster of nodes (e.g., selecting a high priority level) may be based at least in part on a priority of data that should be collected (or received) or transmitted (e.g., communicated) by the UE, and/or based at least in part on an application used by the UE. The priority level may be based at least in part on a capability of the cluster of nodes in transferring a certain amount of energy to the UE, or a capability of the cluster of nodes to be engaged in transferring energy to the UE. The capability may be associated with transmitting power levels or amounts of power that could be used in energy transfer, or the capability may be associated with periods of time that a node within the cluster of nodes could be engaged in energy transfer. In one example, a first cluster of nodes that is capable of transmitting a greater amount of power over a period of time as compared to a second cluster of nodes may be associated with a higher priority than the second cluster of nodes. The network node may determine the cluster of nodes to be used for energy harvesting at the UE based at least in part on priorities associated with different clusters of nodes.

In some aspects, the network node may order and/or update clusters of nodes based at least in part on the priority of the clusters of nodes in supplying power to the UE. The priority may be based at least in part on the capability of the cluster of nodes to send power to the UE or to be engaged in charging the UE. The network node may transmit, to the UE, the indication of the cluster of nodes to be used for energy harvesting at the UE based at least in part on the ordering and/or updating of the clusters of nodes.

In some aspects, a band of operation of energy providing UEs and associated bandwidth parts (BWPs) or bandwidths, and a band or bands of collecting energy at an Rx energy harvesting UE (e.g., energy harvesting bands or BWPs or bandwidths) may be defined. A clustering (or adding a UE to a cluster) or order or priority of a cluster may be based at least in part on having the same transmit band/BWP, or based at least in part on having a defined amount of overlap in a transmit BWP. The transmit BWP may be associated with an uplink BWP, a sidelink BWP, a sidelink bandwidth, or energy transmit band(s) or bandwidths or BWPs, which may be different from uplink or sidelink bands or BWPs, or may overlap with the uplink or sidelink bands or BWPs. For example, an energy providing UE may have certain dedicated bands or BWPs or bandwidths to provide energy, which may be based at least in part on a capability reported over time via layer 1 (L1), layer 2 (L2), or layer 3 (L3) signaling. The dedicated bands or BWPs or bandwidths to provide energy may change a cluster of UEs, or may determine whether a particular UE is allowed to be part of a certain cluster. In some aspects, a priority/order given to different power providing UEs or clusters may be assigned/given to power/energy providing UEs or clusters based at least in part on an overlap between the energy transmit band (e.g., assuming the energy will be transmitted on certain bands/BWPs/bandwidths by such UEs), or BWP or bandwidth (of UEs within cluster), and a receive energy band or BWP or bandwidth of an energy harvesting UE.

In some aspects, a priority associated with a cluster may increase based at least in part on a higher charging rate or power/energy (or expected or predicted values of such quantities) provided by the cluster to energy harvesting UEs. In some aspects, clusters may be ordered/updated based at least in part on a priority of a supplying power. The supplying power may be measured by a capability of underlying UEs/CPEs to transmit power (during times when energy is needed) or to be engaged in charging (during times when energy is needed), or to satisfy a certain charging rate requirement or input power to energy harvesting circuits at energy harvesting UEs.

In some aspects, the UE and/or the network node may receive, from a node in the cluster of nodes, an indication of a capability of the node. The UE and/or the network node may receive the indication of the capability of the node via L1, L2, or L3 signaling. The indication of the capability of the node may indicate an offer of a target power for the UE, an offer of a charging rate, an offer of a charging time, and/or an offer of a maximum charging transmit power within a time period. The indication may be based at least in part on other tasks to be performed at the node. The indication may be associated with a validity time. The UE and/or the network node may receive, from the node in the cluster of nodes, an updated indication after an expiration of the validity time or within the validity time. In other words, the capability of the node may change over time. The network node may transmit, to the UE, the indication of the cluster of nodes to be used for energy harvesting at the UE based at least in part on the indication received from the node in the cluster of nodes.

In some aspects, the UE may receive the indication of the capability of the node via L1, L2, or L3 signaling. The UE may receive, from the network node, the indication of the capability based at least in part on downlink control information (DCI), a dedicated PDSCH for a purpose of sharing a capability, a medium access control control element (MAC-CE), RRC signaling, initial access messages, and/or capability information. The capability information may be in response to a capability enquiry or user assistance information. In some aspects, the UE may receive, from the node (e.g., another UE, such as a primary UE) via a sidelink interface, the indication of the capability based at least in part on sidelink control information (SCI), a dedicated PDSCH for a purpose of sharing a capability, a PC5-MAC-CE, PC5-RRC signaling, user assistance information, initial access messages, and/or capability information as a response to a capability enquiry. In some aspects, the UE may receive, from the network node or the node, indications of clusters of nodes and/or capabilities of nodes via a new interface, link, and/or modem. Further, an energy transfer may not be limited through a Uu link/modem/interface, a sidelink/modem/interface, and/or a new link/modem/interface.

In some aspects, the UE and/or the network node may receive, from the node in the cluster of nodes, a power headroom report associated with the node. A maximum power offered by the node for energy harvesting may be based at least in part on the power headroom report associated with the node. The network node may transmit, to the UE, the indication of the cluster of nodes to be used for energy harvesting at the UE based at least in part on the power headroom report received from the node in the cluster of nodes.

In some aspects, since the node may be busy performing other tasks, the node may offer a certain target power (Po) to the UE, a certain charging rate, a certain charging time (or charging offering time), and/or a maximum charging transmit power within a time interval of X millisecond/slots/symbols/time units. The offer of the certain time power, the certain charging rate, the certain charging time, or the maximum charging transmit power may indicate charging capabilities associated with the node and whether the node is suitable to charge the UE. The node may indicate various offers related to charging capability, such as the charging offering time, and other parameters. The indication of the offers related to charging capability may be valid for a certain time period. For example, the node may update an instant value used for energy transfer within the charging offering time. After the certain time period has expired (e.g., the indication of the offers related to the charging capability is no longer valid), the node may indicate another offer related to charging capability. After the certain time period has expired and another offer related to charging capability has not been indicated, the network node and/or UE may assume that the node is currently not available for charging the UE.

In some aspects, the node may transmit the maximum charging transmit power and the charging rate. When the UE is able to determine a pathloss to the node and a transmit power, the UE may be able to estimate the charging rate based at least in part on the pathloss and the transmit power. In some aspects, since the node may be involved in other tasks, the node may transmit the power headroom report to the network node and/or the UE. The power headroom report may be different than an indication of a maximum power that the node will use for charging. The network node and/or the UE may determine, based at least in part on the power headroom report, whether the maximum power offered by the node for energy harvesting is likely to be used or not. Further, the node may continually update the maximum power offered for energy harvesting, based at least in part on changes to a power headroom of the node.

In some aspects, the cluster of nodes may be based at least in part on CSI associated with the cluster of nodes. For example, the network node may determine an instantaneous CSI or an average CSI associated with links between the UE and the cluster of nodes, which may enable the network node to determine that the cluster of nodes is well suited to provide power to the UE.

In some aspects, the UE, rather than the network node, may determine the cluster of nodes to be used for energy harvesting. The UE may determine the cluster of nodes based at least in part on positions associated with nodes in relation to the UE, zone identifiers associated with the nodes, path losses associated with the nodes, capabilities associated with the nodes with respect to charging the UE, and/or CSI associated with the nodes. The UE may determine the cluster of nodes based at least in part on indications of offers received from the nodes, as well as power headroom reports received from the nodes. In some aspects, the UE may be a decision maker with regards to forming the cluster of nodes, as opposed to the network node.

In some aspects, the UE may transmit, to the network node, an indication of potential clusters of nodes to be used for energy harvesting. The indication received from the network node may be based at least in part on the indication of potential clusters of nodes. For example, the UE may send a list of different combinations of nodes that may potentially be clustered together to form the cluster of nodes. Further, the UE may transmit, to the network node, an indication of a best node from the list of different combinations of nodes, where the best node may be capable of providing a best target power, charging rate, charging time, maximum charging transmit power, etc., as compared to other nodes. The network node may select the cluster of nodes based at least in part on the indication of potential clusters of nodes, as received from the UE.

In some aspects, the UE may receive the indication of the cluster of nodes from the network node, where the indication may indicate an assignment of time division multiplexing (TDM) or frequency division multiplexing (FDM) on orthogonal resources for receiving the signals associated with the energy harvesting. The network node may request the cluster of nodes to perform a single frequency network (SFN)-like energy flooding or assign TDM/FDM on the orthogonal resources. The UE may harvest energy from the signals in an analog domain.

In some aspects, the UE may receive energy (or data) from the cluster of nodes. In this case, the cluster of nodes may be associated with a higher priority, as compared to other clusters of nodes, based at least in part on the cluster of nodes sending the energy (or data) to the UE. In other words, when the cluster of nodes sends data to the UE, the cluster of nodes may be given the higher priority in charging and obtaining data resources, which may provide a motivation to nodes to charge other devices.

In some aspects, the network node may transmit, to the cluster of nodes, an indication that the cluster of nodes are to provide signals to the UE for energy harvesting at the UE. In other words, after selecting the cluster of nodes, the network node may instruct the cluster of nodes to send/transfer energy to the UE.

As shown by reference number 1204, the UE may receive, from the cluster of nodes that includes the node, the signals based at least in part on the indication of the cluster of nodes. In some aspects, the UE may receive the signals via a sidelink interface between the UE and the cluster of nodes, when the cluster of nodes correspond to other UEs. For example, the UE may have a separate sidelink interface with each node in the cluster of nodes. The UE may receive the signals via an interface other than a sidelink interface when the cluster of nodes correspond to CPEs, dedicated cells, or network nodes. The cluster of nodes may transmit, to the UE, the signals based at least in part on the indication that the cluster of nodes received from the network node. Alternatively, the UE may receive the signals from the cluster of nodes, as determined by the UE. The signals may be RF signals. In some aspects, the UE may receive the signals from a subset of nodes in the cluster of nodes, or the UE may receive the signals from multiple clusters of nodes.

As shown by reference number 1206, the UE may harvest energy from the signals for charging a battery of the UE. For example, the UE may generate energy from the signals received from the cluster of nodes. The UE may use the energy to charge a battery of the UE. As a result, the UE may harvest energy from the cluster of nodes, which may be located relatively close to the UE and capable of charging the UE.

As indicated above, FIG. 12 is provided as an example. Other examples may differ from what is described with regard to FIG. 12.

Figure 13:
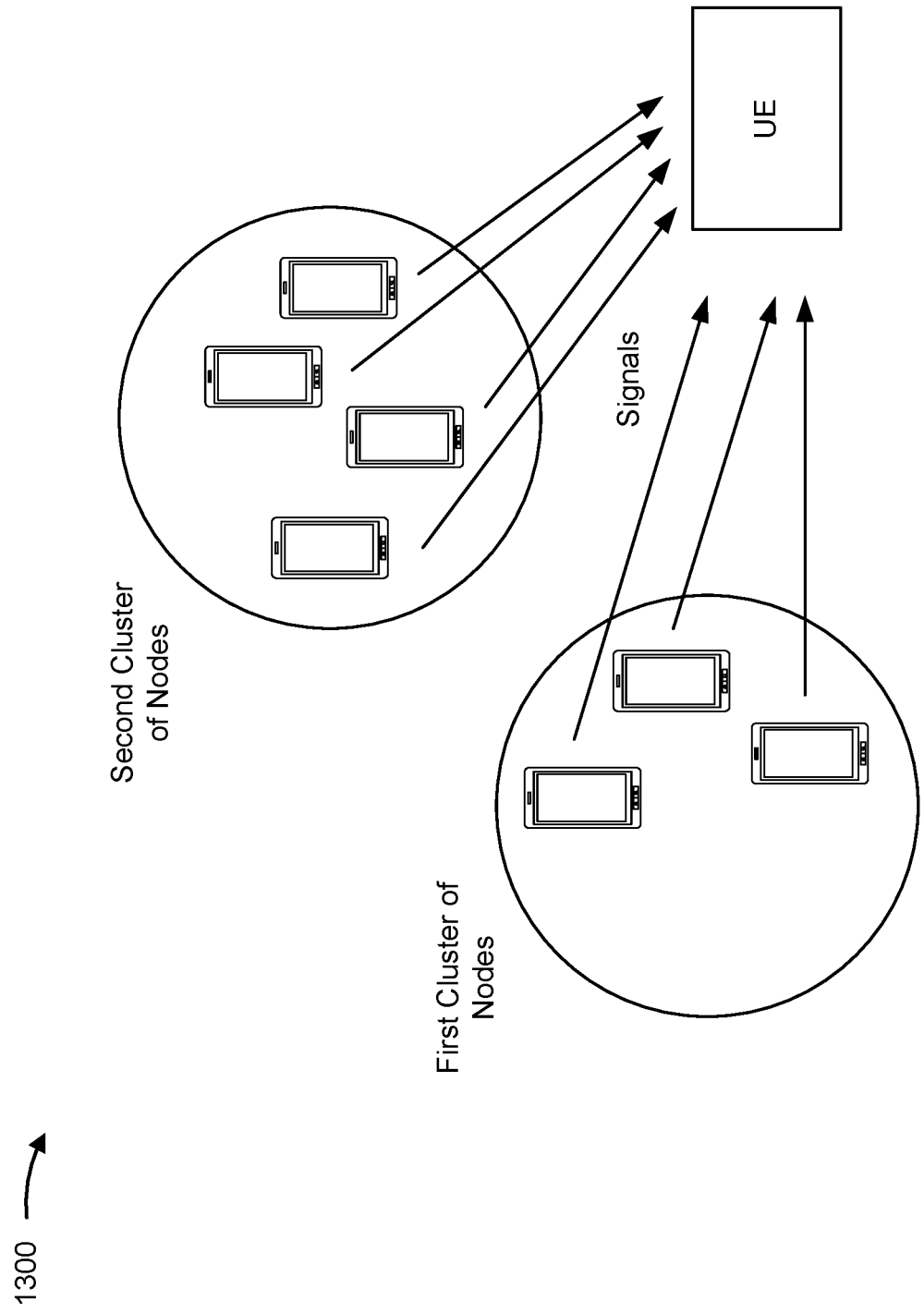

FIG. 13 is a diagram illustrating an example 1300 associated with harvesting energy from clusters of nodes, in accordance with the present disclosure.

As shown in FIG. 13, a UE (e.g., an IoT device) may be associated with multiple clusters of nodes, such as a first cluster of nodes and a second cluster of nodes. The first cluster of nodes may be associated with a same zone identifier, and the second cluster of nodes may be associated with a same zone identifier, where the zone identifier associated with the first cluster of nodes may be different than the zone identifier associated with the second cluster of nodes. The first cluster of nodes and/or the second cluster of nodes may transmit signals to the UE, based at least in part on an indication received from a base station or a determination made by the UE. The UE may harvest energy from the signals received from the first cluster of nodes and/or the second cluster of nodes. The UE may charge a battery of the UE using the harvested energy.

As indicated above, FIG. 13 is provided as an example. Other examples may differ from what is described with regard to FIG. 13.

Figure 14:
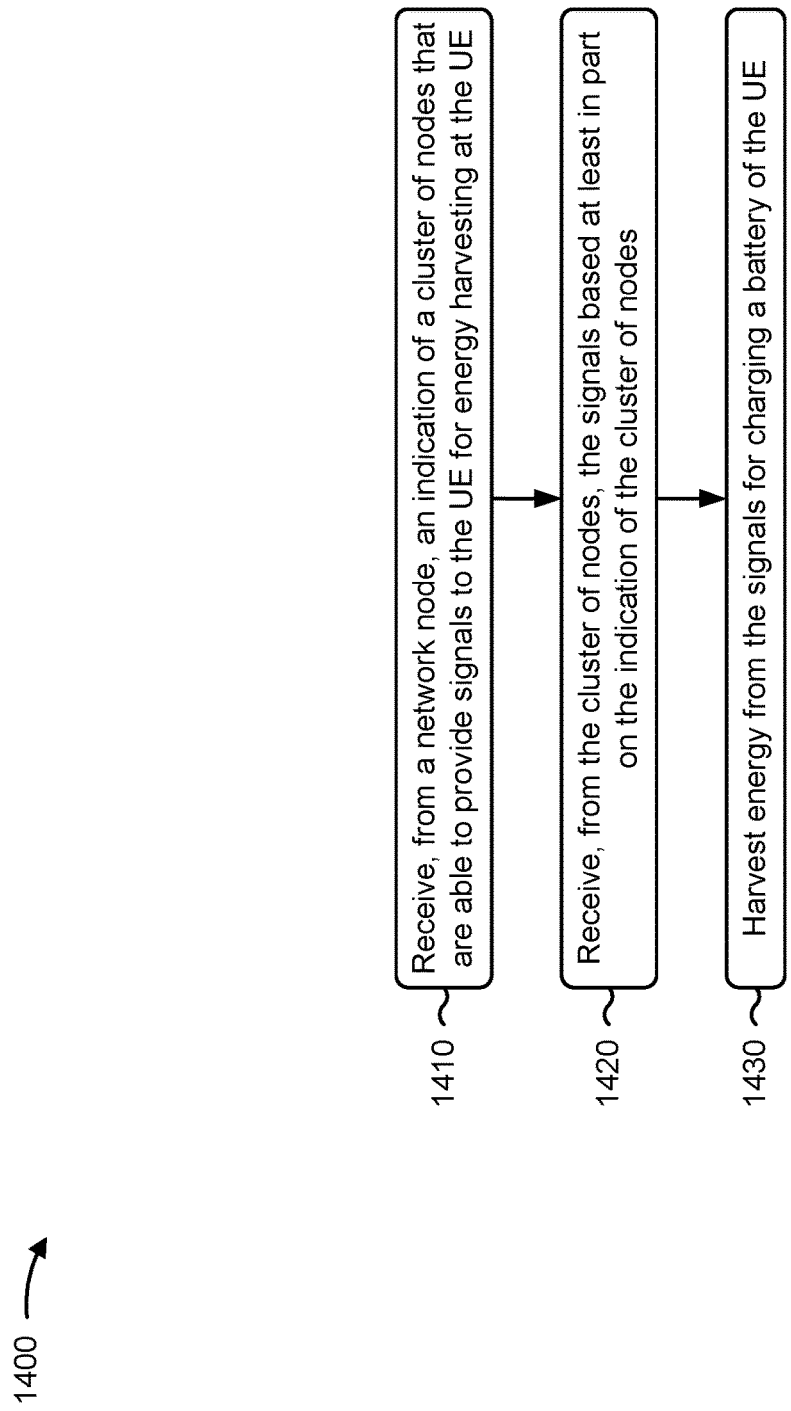
FIGS. 14-15 are diagrams illustrating example processes associated with harvesting energy from clusters of nodes, in accordance with the present disclosure.

FIG. 14 is a diagram illustrating an example process 1400 performed, for example, by a UE, in accordance with the present disclosure. Example process 1400 is an example where the UE (e.g., UE 120) performs operations associated with harvesting energy from clusters of nodes.

As shown in FIG. 14, in some aspects, process 1400 may include receiving, from a network node, an indication of a cluster of nodes that are able to provide signals to the UE for energy harvesting at the UE (block 1410). For example, the UE (e.g., using communication manager 140 and/or reception component 1602, depicted in FIG. 16) may receive, from a network node, an indication of a cluster of nodes that are able to provide signals to the UE for energy harvesting at the UE, as described above in connection with FIGS. 12-13.

As further shown in FIG. 14, in some aspects, process 1400 may include receiving, from the cluster of nodes, the signals based at least in part on the indication of the cluster of nodes (block 1420). For example, the UE (e.g., using communication manager 140 and/or reception component 1602, depicted in FIG. 16) may receive, from the cluster of nodes, the signals based at least in part on the indication of the cluster of nodes, as described above in connection with FIGS. 12-13.

As further shown in FIG. 14, in some aspects, process 1400 may include harvesting energy from the signals for charging a battery of the UE (block 1430). For example, the UE (e.g., using communication manager 140 and/or harvesting component 1608, depicted in FIG. 16) may harvest energy from the signals for charging a battery of the UE, as described above in connection with FIGS. 12-13.

Process 1400 may include additional aspects, such as any single aspect or any combination of aspects described below and/or in connection with one or more other processes described elsewhere herein.

In a first aspect, the cluster of nodes is associated with a position that is within a range of a position associated with the UE.

In a second aspect, alone or in combination with the first aspect, the cluster of nodes includes a plurality of nodes that are associated with a same zone identifier.

In a third aspect, alone or in combination with one or more of the first and second aspects, the cluster of nodes includes a plurality of nodes that are associated with a same pathloss range in relation to the UE.

In a fourth aspect, alone or in combination with one or more of the first through third aspects, the cluster of nodes includes one or more of other UEs and the signals are received via a sidelink, CPEs, dedicated cells or devices, or network nodes, and the UE is an IoT device.

In a fifth aspect, alone or in combination with one or more of the first through fourth aspects, the cluster of nodes is associated with a priority level in relation to other clusters of nodes, and the priority level is based at least in part on a capability of the cluster of nodes in transferring a certain amount of energy to the UE or a capability of the cluster of nodes to be engaged in transferring energy to the UE, and the capability is associated with transmitting power levels or amounts of power useable for energy transfer or periods of time that a node within the cluster of nodes is available for the energy transfer, and the priority level is based at least in part on a priority of data to be communicated by the UE or an application used by the UE.

In a sixth aspect, alone or in combination with one or more of the first through fifth aspects, process 1400 includes receiving the signals from a subset of nodes in the cluster of nodes, or receiving the signals from multiple clusters of nodes.

In a seventh aspect, alone or in combination with one or more of the first through sixth aspects, process 1400 includes receiving, from a node in the cluster of nodes, an indication of a capability of the node that includes one or more of an offer of a target power for the UE, an offer of a charging rate or a charging time, or an offer of a maximum charging transmit power within a time period, wherein the indication is based at least in part on other tasks to be performed at the node, and the indication is associated with a validity time.

In an eighth aspect, alone or in combination with one or more of the first through seventh aspects, process 1400 includes receiving, from a node in the cluster of nodes, an indication of a capability of the node that includes one or more of: an offer of a target power for the UE, an offer of a charging rate or a charging time, or an offer of a maximum charging transmit power within a time period, wherein the indication is based at least in part on other tasks to be performed at the node, and the indication is associated with a validity time.

In a ninth aspect, alone or in combination with one or more of the first through eighth aspects, process 1400 includes receiving, from a node in the cluster of nodes, an indication of a power headroom associated with the node, wherein a maximum power offered by the node for energy harvesting is based at least in part on the power headroom associated with the node.

In a tenth aspect, alone or in combination with one or more of the first through ninth aspects, the cluster of nodes is based at least in part on CSIs associated with the cluster of nodes.

In an eleventh aspect, alone or in combination with one or more of the first through tenth aspects, process 1400 includes transmitting, to the network node, an indication of potential clusters of nodes to be used for energy harvesting, wherein the indication received from the network node is based at least in part on the indication of potential clusters of nodes.

In a twelfth aspect, alone or in combination with one or more of the first through eleventh aspects, the indication of the cluster of nodes indicates a number of nodes from the cluster of nodes to be used for energy harvesting or a maximum number of nodes from the cluster of nodes to be used for energy harvesting.

In a thirteenth aspect, alone or in combination with one or more of the first through twelfth aspects, the indication of the cluster of nodes indicates an assignment of TDM or FDM on orthogonal resources for receiving the signals associated with the energy harvesting, and the energy harvesting occurs in an analog domain.

In a fourteenth aspect, alone or in combination with one or more of the first through thirteenth aspects, process 1400 includes receiving energy from the cluster of nodes, wherein the cluster of nodes is associated with a higher priority, as compared to other clusters of nodes, based at least in part on the cluster of nodes sending the energy to the UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
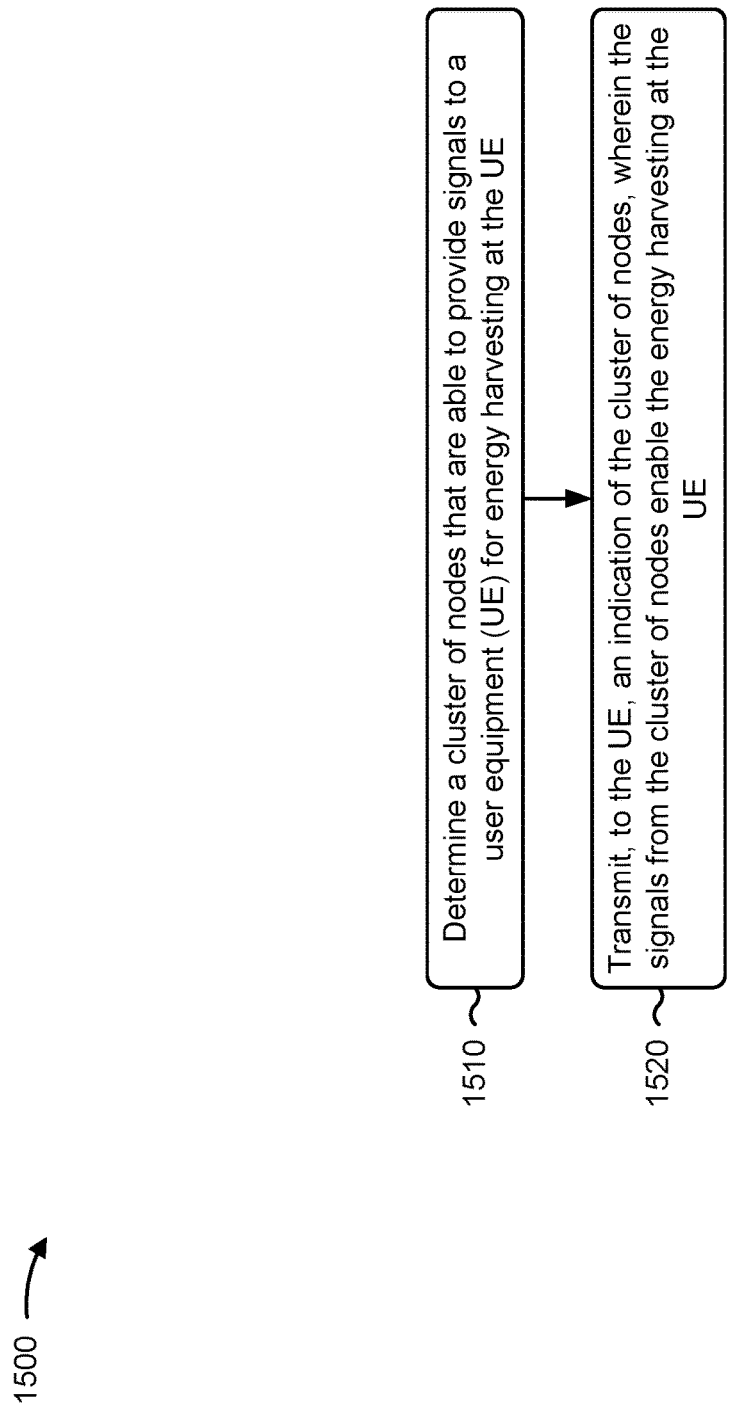

FIG. 15 is a diagram illustrating an example process 1500 performed, for example, by a network node, in accordance with the present disclosure. Example process 1500 is an example where the network node (e.g., base station 110) performs operations associated with harvesting energy from clusters of nodes.

As shown in FIG. 15, in some aspects, process 1500 may include determining a cluster of nodes that are able to provide signals to a UE for energy harvesting at the UE (block 1510). For example, the network node (e.g., using communication manager 150 and/or determination component 1708, depicted in FIG. 17) may determine a cluster of nodes that are able to provide signals to a UE for energy harvesting at the UE, as described above in connection with FIGS. 12-13.

As further shown in FIG. 15, in some aspects, process 1500 may include transmitting, to the UE, an indication of the cluster of nodes, wherein the signals from the cluster of nodes enable the energy harvesting at the UE (block 1520). For example, the network node (e.g., using communication manager 150 and/or transmission component 1704, depicted in FIG. 17) may transmit, to the UE, an indication of the cluster of nodes, wherein the signals from the cluster of nodes enable the energy harvesting at the UE, as described above in connection with FIGS. 12-13.

Process 1500 may include additional aspects, such as any single aspect or any combination of aspects described below and/or in connection with one or more other processes described elsewhere herein.

In a first aspect, process 1500 includes determining the cluster of nodes based at least in part on one or more of a position associated with the cluster of nodes in relation to a position associated with the UE, a zone identifier associated with the cluster of nodes, or a pathloss associated with the cluster of nodes.

In a second aspect, alone or in combination with the first aspect, process 1500 includes receiving, from a node in the cluster of nodes, an indication of a capability of the node that includes one or more of an offer of a target power for the UE, an offer of a charging rate or a charging time, or an offer of a maximum charging transmit power within a time period, wherein the cluster of nodes is based at least in part on the indication of the capability of the node.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
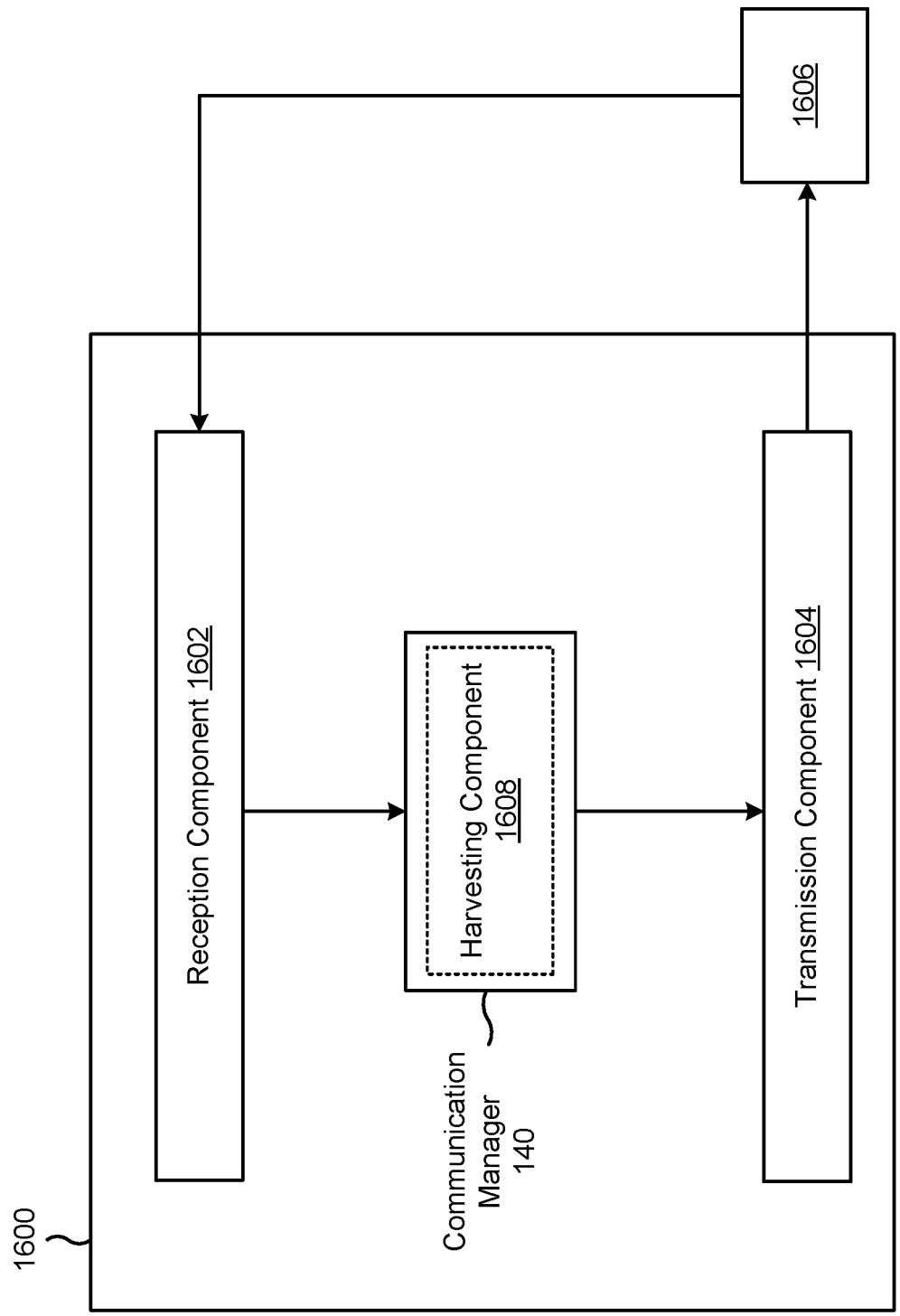
FIGS. 16-17 are diagrams of example apparatuses for wireless communication, in accordance with the present disclosure.

FIG. 16 is a diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include a harvesting component 1608, among other examples.

In some aspects, the apparatus 1600 may be configured to perform one or more operations described herein in connection with FIGS. 12-13. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The reception component 1602 may receive, from a network node, an indication of a cluster of nodes that are able to provide signals to the UE for energy harvesting at the UE. The reception component 1602 may receive, from the cluster of nodes, the signals based at least in part on the indication of the cluster of nodes. The harvesting component 1608 may harvest energy from the signals for charging a battery of the UE.

The reception component 1602 may receive the signals from a subset of nodes in the cluster of nodes. The reception component 1602 may receive the signals from multiple clusters of nodes. The reception component 1602 may receive, from a node in the cluster of nodes, an indication of a capability of the node that includes one or more of: an offer of a target power for the UE, an offer of a charging rate or a charging time, or an offer of a maximum charging transmit power within a time period, wherein the indication is based at least in part on other tasks to be performed at the node, and the indication is associated with a validity time. The reception component 1602 may receive, from the node in the cluster of nodes, an updated indication after an expiration of the validity time or within the validity time. The reception component 1602 may receive, from a node in the cluster of nodes, an indication of a power headroom associated with the node, wherein a maximum power offered by the node for energy harvesting is based at least in part on the power headroom associated with the node.

The transmission component 1604 may transmit, to the network node, an indication of potential clusters of nodes to be used for energy harvesting, wherein the indication received from the network node is based at least in part on the indication of potential clusters of nodes. The reception component 1602 may receive energy from the cluster of nodes, wherein the cluster of nodes is associated with a higher priority, as compared to other clusters of nodes, based at least in part on the cluster of nodes sending the energy to the UE.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
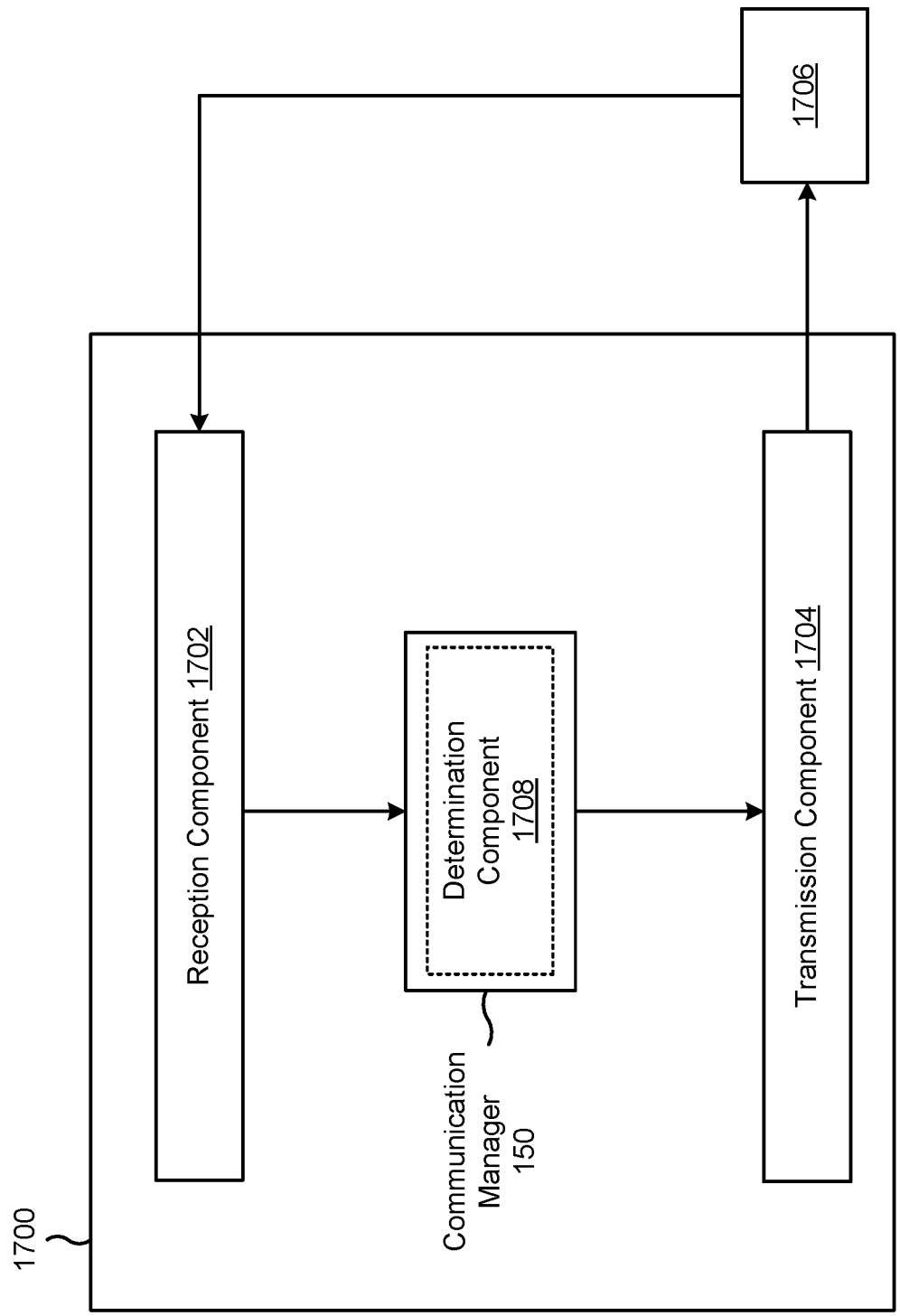

FIG. 17 is a diagram of an example apparatus 1700 for wireless communication. The apparatus 1700 may be a network node, or a network node may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 150. The communication manager 150 may include a determination component 1708, among other examples.

In some aspects, the apparatus 1700 may be configured to perform one or more operations described herein in connection with FIGS. 12-13. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

The determination component 1708 may determine a cluster of nodes that are able to provide signals to a UE for energy harvesting at the UE. The transmission component 1704 may transmit, to the UE, an indication of the cluster of nodes, wherein the signals from the cluster of nodes enable the energy harvesting at the UE.

The determination component 1708 may determine the cluster of nodes based at least in part on one or more of: a position associated with the cluster of nodes in relation to a position associated with the UE, a zone identifier associated with the cluster of nodes, or a pathloss associated with the cluster of nodes. The reception component 1702 may receive, from a node in the cluster of nodes, an indication of a capability of the node that includes one or more of: an offer of a target power for the UE, an offer of a charging rate or a charging time, or an offer of a maximum charging transmit power within a time period, wherein the cluster of nodes is based at least in part on the indication of the capability of the node.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
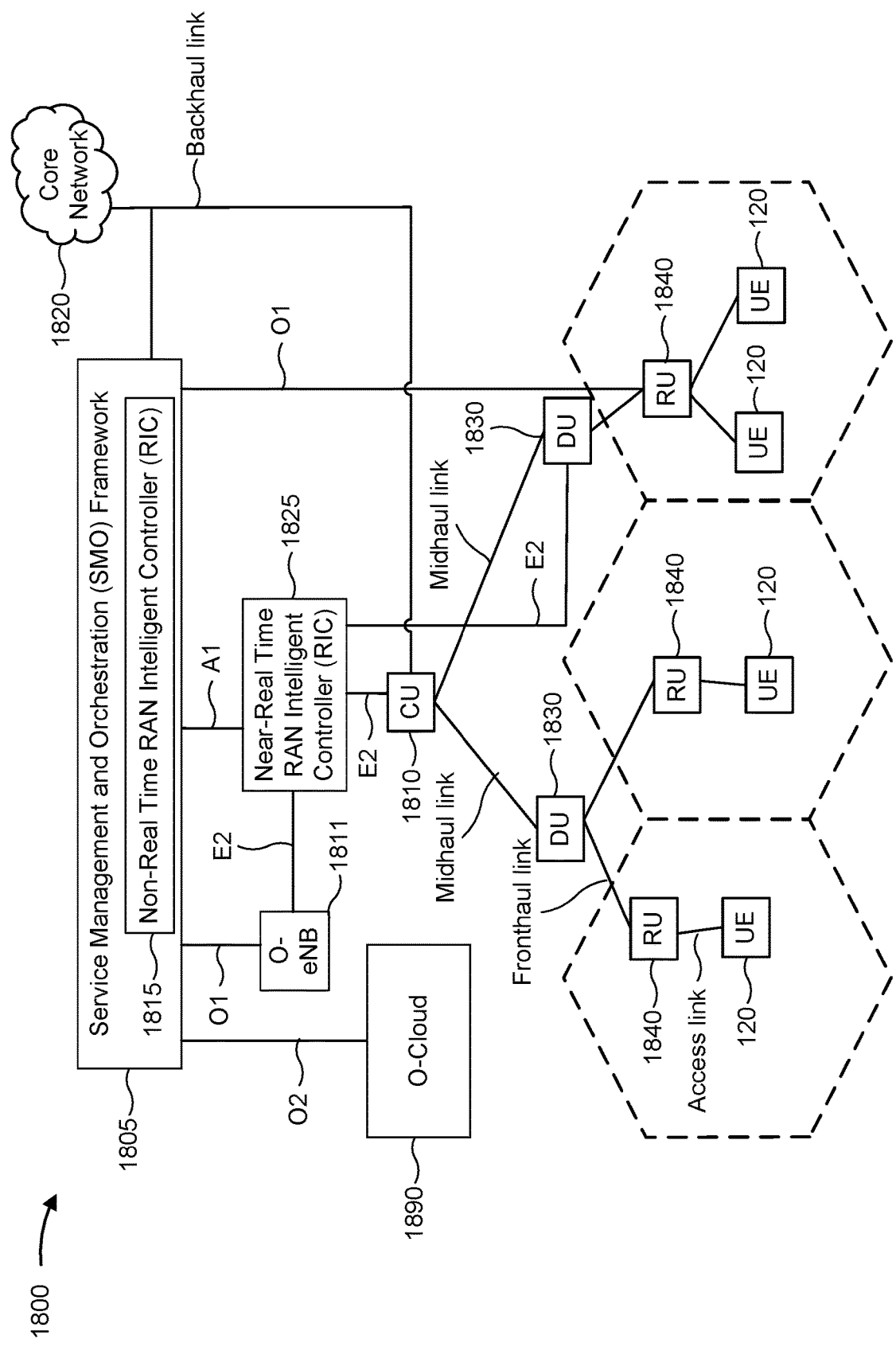
FIG. 18 is a diagram illustrating an example of a disaggregated base station architecture, in accordance with the present disclosure.

FIG. 18 is a diagram illustrating an example 1800 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 18 may include one or more CUs 1810 that can communicate directly with a core network 1820 via a backhaul link, or indirectly with the core network 1820 through one or more disaggregated base station units (such as a Near-RT RIC 1825 via an E2 link, or a Non-RT RIC 1815 associated with a Service Management and Orchestration (SMO) Framework 1805, or both). A CU 1810 may communicate with one or more DUs 1830 via respective midhaul links, such as an F1 interface. The DUs 1830 may communicate with one or more RUs 1840 via respective fronthaul links. The RUs 1840 may communicate with respective UEs 120 via one or more radio frequency (RF) access links. In some implementations, the UE 120 may be simultaneously served by multiple RUs 1840.

Each of the units (e.g., the CUs 1810, the DUs 1830, the RUs 1840), as well as the Near-RT RICs 1825, the Non-RT RICs 1815, and the SMO Framework 1805, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1810 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 1810. The CU 1810 may be configured to handle user plane functionality (e.g., Central Unit-User Plane (CU-UP)), control plane functionality (e.g., Central Unit-Control Plane (CU-CP)), or a combination thereof. In some implementations, the CU 1810 can be logically split into one or more CU-UP units and one or more CU-CP units. The CU-UP unit can communicate bidirectionally with the CU-CP unit via an interface, such as the E1 interface when implemented in an O-RAN configuration. The CU 1810 can be implemented to communicate with the DU 1830, as necessary, for network control and signaling.

The DU 1830 may correspond to a logical unit that includes one or more base station functions to control the operation of one or more RUs 1840. In some aspects, the DU 1830 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1830 may further host one or more low-PHY layers. Each layer (or module) can be implemented with an interface configured to communicate signals with other layers (and modules) hosted by the DU 1830, or with the control functions hosted by the CU 1810.

Lower-layer functionality can be implemented by one or more RUs 1840. In some deployments, an RU 1840, controlled by a DU 1830, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1840 can be implemented to handle over the air (OTA) communication with one or more UEs 120. In some implementations, real-time and non-real-time aspects of control and user plane communication with the RU(s) 1840 can be controlled by the corresponding DU 1830. In some scenarios, this configuration can enable the DU(s) 1830 and the CU 1810 to be implemented in a cloud-based RAN architecture, such as a vRAN architecture.

The SMO Framework 1805 may be configured to support RAN deployment and provisioning of non-virtualized and virtualized network elements. For non-virtualized network elements, the SMO Framework 1805 may be configured to support the deployment of dedicated physical resources for RAN coverage requirements which may be managed via an operations and maintenance interface (such as an O1 interface). For virtualized network elements, the SMO Framework 1805 may be configured to interact with a cloud computing platform (such as an open cloud (O-Cloud) 1890) to perform network element life cycle management (such as to instantiate virtualized network elements) via a cloud computing platform interface (such as an O2 interface). Such virtualized network elements can include, but are not limited to, CUs 1810, DUs 1830, RUs 1840 and Near-RT RICs 1825. In some implementations, the SMO Framework 1805 can communicate with a hardware aspect of a 4G RAN, such as an open eNB (O-eNB) 1811, via an O1 interface. Additionally, in some implementations, the SMO Framework 1805 can communicate directly with one or more RUs 1840 via an O1 interface. The SMO Framework 1805 also may include a Non-RT RIC 1815 configured to support functionality of the SMO Framework 1805.

The Non-RT RIC 1815 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1825. The Non-RT RIC 1815 may be coupled to or communicate with (such as via an AI interface) the Near-RT RIC 1825. The Near-RT RIC 1825 may be configured to include a logical function that enables near-real-time control and optimization of RAN elements and resources via data collection and actions over an interface (such as via an E2 interface) connecting one or more CUs 1810, one or more DUs 1830, or both, as well as an O-eNB, with the Near-RT RIC 1825.

In some implementations, to generate AI/ML models to be deployed in the Near-RT RIC 1825, the Non-RT RIC 1815 may receive parameters or external enrichment information from external servers. Such information may be utilized by the Near-RT RIC 1825 and may be received at the SMO Framework 1805 or the Non-RT RIC 1815 from non-network data sources or from network functions. In some examples, the Non-RT RIC 1815 or the Near-RT RIC 1825 may be configured to tune RAN behavior or performance. For example, the Non-RT RIC 1815 may monitor long-term trends and patterns for performance and employ AI/ML models to perform corrective actions through the SMO Framework 1805 (such as reconfiguration via 01) or via creation of RAN management policies (such as AI policies).

As indicated above, FIG. 18 is provided as an example. Other examples may differ from what is described with regard to FIG. 18.

The following provides an overview of some Aspects of the present disclosure:

Aspect 1: A method of wireless communication performed by a user equipment (UE), comprising: receiving, from a network node, an indication of a cluster of nodes that are able to provide signals to the UE for energy harvesting at the UE; receiving, from the cluster of nodes, the signals based at least in part on the indication of the cluster of nodes; and harvesting energy from the signals for charging a battery of the UE.

Aspect 2: The method of Aspect 1, wherein the cluster of nodes is associated with a position that is within a range of a position associated with the UE.

Aspect 3: The method of any of Aspects 1 through 2, wherein the cluster of nodes includes a plurality of nodes that are associated with a same zone identifier.

Aspect 4: The method of any of Aspects 1 through 3, wherein the cluster of nodes includes a plurality of nodes that are associated with a same pathloss range in relation to the UE.

Aspect 5: The method of any of Aspects 1 through 4, wherein the cluster of nodes includes one or more of: other UEs and the signals are received via a sidelink, customer premises equipments, dedicated cells or devices, or network nodes, and the UE is an Internet of Things device.

Aspect 6: The method of any of Aspects 1 through 5, wherein the cluster of nodes is associated with a priority level in relation to other clusters of nodes, wherein the priority level is based at least in part on a priority of data to be communicated by the UE or an application used by the UE, wherein the priority level is based at least in part on a capability of the cluster of nodes in transferring a certain amount of energy to the UE or a capability of the cluster of nodes to be engaged in transferring energy to the UE, and wherein the capability is associated with transmitting power levels or amounts of power useable for energy transfer or periods of time that a node within the cluster of nodes is available for the energy transfer.

Aspect 7: The method of any of Aspects 1 through 6, wherein receiving the signals comprises: receiving the signals from a subset of nodes in the cluster of nodes; or receiving the signals from multiple clusters of nodes.

Aspect 8: The method of any of Aspects 1 through 7, further comprising: receiving, from a node in the cluster of nodes, an indication of a capability of the node that includes one or more of: an offer of a target power for the UE, an offer of a charging rate or a charging time, or an offer of a maximum charging transmit power within a time period, wherein the indication is based at least in part on other tasks to be performed at the node, and wherein the indication is associated with a validity time.

Aspect 9: The method of Aspect 8, wherein the indication is associated with a validity time, and further comprising receiving, from the node in the cluster of nodes, an updated indication after an expiration of the validity time or within the validity time.

Aspect 10: The method of any of Aspects 1 through 9, further comprising: receiving, from a node in the cluster of nodes, an indication of a power headroom associated with the node, wherein a maximum power offered by the node for energy harvesting is based at least in part on the power headroom associated with the node.

Aspect 11: The method of any of Aspects 1 through 10, wherein the cluster of nodes is based at least in part on channel state information associated with the cluster of nodes.

Aspect 12: The method of any of Aspects 1 through 11, further comprising: transmitting, to the network node, an indication of potential clusters of nodes to be used for energy harvesting, wherein the indication received from the network node is based at least in part on the indication of potential clusters of nodes.

Aspect 13: The method of any of Aspects 1 through 12, wherein the indication of the cluster of nodes indicates a number of nodes from the cluster of nodes to be used for energy harvesting or a maximum number of nodes from the cluster of nodes to be used for energy harvesting.

Aspect 14: The method of any of Aspects 1 through 13, wherein the indication of the cluster of nodes indicates an assignment of time division multiplexing or frequency division multiplexing on orthogonal resources for receiving the signals associated with the energy harvesting, and wherein the energy harvesting occurs in an analog domain.

Aspect 15: The method of any of Aspects 1 through 14, further comprising: receiving energy from the cluster of nodes, wherein the cluster of nodes is associated with a higher priority, as compared to other clusters of nodes, based at least in part on the cluster of nodes sending the energy to the UE.

Aspect 16: A method of wireless communication performed by a network node, comprising: determining a cluster of nodes that are able to provide signals to a user equipment (UE) for energy harvesting at the UE; and transmitting, to the UE, an indication of the cluster of nodes, wherein the signals from the cluster of nodes enable the energy harvesting at the UE.

Aspect 17: The method of Aspect 16, wherein determining the cluster of nodes comprises determining the cluster of nodes based at least in part on one or more of: a position associated with the cluster of nodes in relation to a position associated with the UE, a zone identifier associated with the cluster of nodes, or a pathloss associated with the cluster of nodes.

Aspect 18: The method of any of Aspects 16 through 17, further comprising: receiving, from a node in the cluster of nodes, an indication of a capability of the node that includes one or more of: an offer of a target power for the UE, an offer of a charging rate or a charging time, or an offer of a maximum charging transmit power within a time period, wherein the cluster of nodes is based at least in part on the indication of the capability of the node.

Aspect 19: An apparatus for wireless communication at a device, comprising a processor; memory coupled with the processor; and instructions stored in the memory and executable by the processor to cause the apparatus to perform the method of one or more of Aspects 1-15.

Aspect 20: A device for wireless communication, comprising a memory and one or more processors coupled to the memory, the one or more processors configured to perform the method of one or more of Aspects 1-15.

Aspect 21: An apparatus for wireless communication, comprising at least one means for performing the method of one or more of Aspects 1-15.

Aspect 22: A non-transitory computer-readable medium storing code for wireless communication, the code comprising instructions executable by a processor to perform the method of one or more of Aspects 1-15.

Aspect 23: A non-transitory computer-readable medium storing a set of instructions for wireless communication, the set of instructions comprising one or more instructions that, when executed by one or more processors of a device, cause the device to perform the method of one or more of Aspects 1-15.

Aspect 24: An apparatus for wireless communication at a device, comprising a processor; memory coupled with the processor; and instructions stored in the memory and executable by the processor to cause the apparatus to perform the method of one or more of Aspects 16-18.

Aspect 25: A device for wireless communication, comprising a memory and one or more processors coupled to the memory, the one or more processors configured to perform the method of one or more of Aspects 16-18.

Aspect 26: An apparatus for wireless communication, comprising at least one means for performing the method of one or more of Aspects 16-18.

Aspect 27: A non-transitory computer-readable medium storing code for wireless communication, the code comprising instructions executable by a processor to perform the method of one or more of Aspects 16-18.

Aspect 28: A non-transitory computer-readable medium storing a set of instructions for wireless communication, the set of instructions comprising one or more instructions that, when executed by one or more processors of a device, cause the device to perform the method of one or more of Aspects 16-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive, from a network node, an indication of a cluster of nodes that are able to provide signals to the UE for energy harvesting at the UE;
      receive, from the cluster of nodes, the signals based at least in part on the indication of the cluster of nodes; and
      harvest energy from the signals for charging a battery of the UE.

2. The apparatus of claim 1, wherein the cluster of nodes is associated with a position that is within a range of a position associated with the UE.

3. The apparatus of claim 1, wherein the cluster of nodes includes a plurality of nodes that are associated with a same zone identifier.

4. The apparatus of claim 1, wherein the cluster of nodes includes a plurality of nodes that are associated with a same pathloss range in relation to the UE.

5. The apparatus of claim 1, wherein the cluster of nodes includes one or more of:
   other UEs and the signals are received via a sidelink, customer premises equipments, dedicated cells or devices, or network nodes, and the UE is an Internet of Things device.

6. The apparatus of claim 1, wherein the cluster of nodes is associated with a priority level in relation to other clusters of nodes, wherein the priority level is based at least in part on a priority of data to be communicated by the UE or an application used by the UE, wherein the priority level is based at least in part on a capability of the cluster of nodes in transferring a certain amount of energy to the UE or a capability of the cluster of nodes to be engaged in transferring energy to the UE, and wherein the capability is associated with transmitting power levels or amounts of power useable for energy transfer or periods of time that a node within the cluster of nodes is available for the energy transfer.

7. The apparatus of claim 1, wherein the one or more processors, to receive the signals, are configured to:
   receive the signals from a subset of nodes in the cluster of nodes; or
   receive the signals from multiple clusters of nodes.

8. The apparatus of claim 1, wherein the one or more processors are further configured to:
   receive, from a node in the cluster of nodes, an indication of a capability of the node that includes one or more of: an offer of a target power for the UE, an offer of a charging rate or a charging time, or an offer of a maximum charging transmit power within a time period, wherein the indication is based at least in part on other tasks to be performed at the node, and wherein the indication is associated with a validity time.

9. The apparatus of claim 8, wherein the one or more processors are further configured to receive, from the node in the cluster of nodes, an updated indication after an expiration of the validity time or within the validity time.

10. The apparatus of claim 1, wherein the one or more processors are further configured to:
   receive, from a node in the cluster of nodes, an indication of a power headroom associated with the node, wherein a maximum power offered by the node for energy harvesting is based at least in part on the power headroom associated with the node.

11. The apparatus of claim 1, wherein the cluster of nodes is based at least in part on channel state information associated with the cluster of nodes.

12. The apparatus of claim 1, wherein the one or more processors are further configured to:
transmit, to the network node, an indication of potential clusters of nodes to be used for energy harvesting, wherein the indication received from the network node is based at least in part on the indication of potential clusters of nodes.

13. The apparatus of claim 1, wherein the indication of the cluster of nodes indicates a number of nodes from the cluster of nodes to be used for energy harvesting or a maximum number of nodes from the cluster of nodes to be used for energy harvesting.

14. The apparatus of claim 1, wherein the indication of the cluster of nodes indicates an assignment of time division multiplexing or frequency division multiplexing on orthogonal resources for receiving the signals associated with the energy harvesting, and wherein the energy harvesting occurs in an analog domain.

15. The apparatus of claim 1, wherein the one or more processors are further configured to:
receive energy from the cluster of nodes, wherein the cluster of nodes is associated with a higher priority, as compared to other clusters of nodes, based at least in part on the cluster of nodes sending the energy to the UE.

16. An apparatus for wireless communication at a network node, comprising:
a memory; and
one or more processors, coupled to the memory, configured to:
determine a cluster of nodes that are able to provide signals to a user equipment (UE) for energy harvesting at the UE; and
transmit, to the UE, an indication of the cluster of nodes, wherein the signals from the cluster of nodes enable the energy harvesting at the UE.

17. The apparatus of claim 16, wherein the one or more processors, to determine the cluster of nodes, are configured to determine the cluster of nodes based at least in part on one or more of: a position associated with the cluster of nodes in relation to a position associated with the UE, a zone identifier associated with the cluster of nodes, or a pathloss associated with the cluster of nodes.

18. The apparatus of claim 16, wherein the one or more processors are configured to:
receive, from a node in the cluster of nodes, an indication of a capability of the node that includes one or more of: an offer of a target power for the UE, an offer of a charging rate or a charging time, or an offer of a maximum charging transmit power within a time period, wherein the cluster of nodes is based at least in part on the indication of the capability of the node.

19. A method of wireless communication performed by a user equipment (UE), comprising:
receiving, from a network node, an indication of a cluster of nodes that are able to provide signals to the UE for energy harvesting at the UE;
receiving, from the cluster of nodes, the signals based at least in part on the indication of the cluster of nodes; and
harvesting energy from the signals for charging a battery of the UE.

20. The method of claim 19, wherein:
the cluster of nodes is associated with a position that is within a range of a position associated with the UE;
the cluster of nodes includes a plurality of nodes that are associated with a same zone identifier; or
the cluster of nodes includes a plurality of nodes that are associated with a same pathloss range in relation to the UE.

21. The method of claim 19, wherein the cluster of nodes includes one or more of:
other UEs and the signals are received via a sidelink, customer premises equipments, dedicated cells or devices, or network nodes, and the UE is an Internet of Things device.

22. The method of claim 19, wherein the cluster of nodes is associated with a priority level in relation to other clusters of nodes, wherein the priority level is based at least in part on a priority of data to be communicated by the UE or an application used by the UE, wherein the priority level is based at least in part on a capability of the cluster of nodes in transferring a certain amount of energy to the UE or a capability of the cluster of nodes to be engaged in transferring energy to the UE, and wherein the capability is associated with transmitting power levels or amounts of power useable for energy transfer or periods of time that a node within the cluster of nodes is available for the energy transfer.

23. The method of claim 19, further comprising:
receiving, from a node in the cluster of nodes, an indication of a capability of the node that includes one or more of: an offer of a target power for the UE, an offer of a charging rate or a charging time, or an offer of a maximum charging transmit power within a time period, wherein the indication is based at least in part on other tasks to be performed at the node, and wherein the indication is associated with a validity time.

24. The method of claim 19, further comprising:
receiving, from a node in the cluster of nodes, an indication of a power headroom associated with the node, wherein a maximum power offered by the node for energy harvesting is based at least in part on the power headroom associated with the node.

25. The method of claim 19, further comprising:
transmitting, to the network node, an indication of potential clusters of nodes to be used for energy harvesting, wherein the indication received from the network node is based at least in part on the indication of potential clusters of nodes.

26. The method of claim 19, wherein the indication of the cluster of nodes indicates a number of nodes from the cluster of nodes to be used for energy harvesting or a maximum number of nodes from the cluster of nodes to be used for energy harvesting.

27. The method of claim 19, further comprising:
receiving energy from the cluster of nodes, wherein the cluster of nodes is associated with a higher priority, as compared to other clusters of nodes, based at least in part on the cluster of nodes sending the energy to the UE.

28. A method of wireless communication performed by a network node, comprising:
determining a cluster of nodes that are able to provide signals to a user equipment (UE) for energy harvesting at the UE; and
transmitting, to the UE, an indication of the cluster of nodes, wherein the signals from the cluster of nodes enable the energy harvesting at the UE.

29. The method of claim 28, wherein determining the cluster of nodes comprises determining the cluster of nodes based at least in part on one or more of: a position associated with the cluster of nodes in relation to a position associated with the UE, a zone identifier associated with the cluster of nodes, or a pathloss associated with the cluster of nodes.

30. The method of claim 28, further comprising:
receiving, from a node in the cluster of nodes, an indication of a capability of the node that includes one or more of: an offer of a target power for the UE, an offer of a charging rate or a charging time, or an offer of a maximum charging transmit power within a time period, wherein the cluster of nodes is based at least in part on the indication of the capability of the node.

* * * * *